(12) United States Patent
Lotfallah et al.

(10) Patent No.: US 10,848,949 B2
(45) Date of Patent: Nov. 24, 2020

(54) EMERGENCY CALL REDIAL ON DIFFERENT PS DOMAINS

(71) Applicant: QUALCOMM Incorporated, San Diego, CA (US)

(72) Inventors: Osama Lotfallah, San Diego, CA (US); Arvind Vardarajan Santhanam, San Diego, CA (US); Stephen William Edge, Escondido, CA (US); Kuo-Chun Lee, San Diego, CA (US); Cherng-Shung Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/684,650

(22) Filed: Nov. 15, 2019

(65) Prior Publication Data

US 2020/0162879 A1 May 21, 2020

Related U.S. Application Data

(60) Provisional application No. 62/769,526, filed on Nov. 19, 2018.

(51) Int. Cl.
| | |
|---|---|
| *H04W 4/90* | (2018.01) |
| *H04W 36/24* | (2009.01) |
| *H04W 36/14* | (2009.01) |
| *H04M 3/424* | (2006.01) |
| *H04W 36/00* | (2009.01) |
| *H04W 88/06* | (2009.01) |
| *H04W 48/18* | (2009.01) |
| *H04W 76/18* | (2018.01) |

(Continued)

(52) U.S. Cl.
CPC ............. *H04W 4/90* (2018.02); *H04M 3/424* (2013.01); *H04W 36/14* (2013.01); *H04W 36/24* (2013.01); *H04W 76/18* (2018.02); *H04W 76/50* (2018.02); *H04M 3/5116* (2013.01); *H04W 36/0022* (2013.01); *H04W 48/18* (2013.01); *H04W 88/06* (2013.01)

(58) Field of Classification Search
CPC ....... H04W 4/90; H04W 36/14; H04W 36/24; H04W 36/0022; H04W 88/06; H04W 48/18; H04W 76/18; H04W 76/50; H04M 3/424; H04M 3/5116
USPC ...................... 455/404.1, 436–445; 370/331
See application file for complete search history.

(56) References Cited

U.S. PATENT DOCUMENTS

| | | | |
|---|---|---|---|
| 2011/0014892 A1* | 1/2011 | Hedman | H04W 76/50 455/404.2 |
| 2011/0141910 A1* | 6/2011 | Rosik | H04W 48/20 370/241 |

(Continued)

*Primary Examiner* — Michael Y Mapa
(74) *Attorney, Agent, or Firm* — The Marbury Law Group, PLLC

(57) ABSTRACT

Systems, methods, and devices of the various aspects may enable a mobile communication device to make a second emergency call attempt in a packet switched (PS) domain in response to determining that a first emergency call attempt in a PS domain failed. The various aspects may enable a second emergency call attempt in a PS domain without requiring the mobile communication device to attempt an emergency call in a circuit switched (CS) domain in response to determining that a first emergency call attempt in a PS domain failed.

16 Claims, 14 Drawing Sheets

(51) Int. Cl.
*H04W 76/50* (2018.01)
*H04M 3/51* (2006.01)

(56) References Cited

U.S. PATENT DOCUMENTS

| | | | | |
|---|---|---|---|---|
| 2014/0045448 | A1* | 2/2014 | Mallick | H04W 4/90 |
| | | | | 455/404.1 |
| 2014/0219272 | A1* | 8/2014 | Shuman | H04W 76/12 |
| | | | | 370/352 |
| 2015/0281929 | A1* | 10/2015 | Shih | H04W 4/90 |
| | | | | 455/404.1 |
| 2017/0134994 | A1* | 5/2017 | Chinthalapudi | H04L 65/1089 |
| 2018/0352408 | A1* | 12/2018 | Baer | H04W 60/04 |

* cited by examiner

EMERGENCY CALL REDIAL ON DIFFERENT PS DOMAINS

RELATED APPLICATIONS

This application claims the benefit of priority to U.S. Provisional Application No. 62/769,526, entitled "Emergency Call Redial On Different PS Domains" filed Nov. 19, 2018, the entire contents of which are hereby incorporated by reference for all purposes.

BACKGROUND

Cellular and wireless communication technologies have seen explosive growth over the past several years and are being used to support communications between a host of different types of communication devices, such as mobile communication devices, vehicle-based communication devices, infrastructure communication devices, network communication devices, etc. This growth has been fueled by better communications hardware, larger networks, and more reliable protocols.

Some designs of mobile communication devices—such as smart phones, tablet computers, and laptop computers—support multiple subscriptions (e.g., multi-subscriber identity module (multi-SIM) mobile communication devices) that provide users with access to multiple separate mobile provider networks. Examples of radio access technologies (RATs) used by mobile provider networks include third generation wireless mobile communication technologies (3G) (e.g., global system for mobile communications (GSM) evolution (EDGE) systems, code division multiple access (CDMA) 2000 systems, Wideband CDMA (WCDMA), etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc. A mobile communication device may utilize a particular RAT to communicate with a network. RATs can operate in two different domains in a mobile provider network, a circuit switched (CS) domain or a packet switched (PS) domain. Examples of CS domain RATs include GSM, WCDMA, etc. Examples of PS domain RATs include LTE, LTE-Advanced, 5G NR, etc.

Mobile communication devices operating according to the 3rd Generation Partnership Project (3GPP) technical specifications can be required to support emergency calls. Increasing the likelihood that such emergency calls are successfully established is desirable.

SUMMARY

Systems, methods, and devices of the various aspects may enable a mobile communication device to make a second emergency call attempt in a packet switched (PS) domain in response to determining that a first emergency call attempt in a PS domain failed. The various aspects may enable a second emergency call attempt in a PS domain without requiring the mobile communication device to attempt an emergency call in a circuit switched (CS) domain in response to determining that a first emergency call attempt in a PS domain failed.

Some aspects include a method for performing an emergency call on a mobile communication device. Various aspects may include attempting to establish an emergency call in a PS domain using a first RAT for a first wireless network, receiving a first indication that the attempt to establish the emergency call in a PS domain using the first RAT has failed, and, in response to the first indication, attempting to establish the emergency call in a PS domain using a second RAT for a second wireless network, wherein the second RAT is different from the first RAT. In some aspects the mobile communication device may be in a normal service state for the first wireless network with a single subscriber identity module or may be in a limited service state for the first wireless network. In some aspects, the first wireless network and the second wireless network may be wireless networks for the same wireless network operator. In some aspects, the first RAT and the second RAT each may include one of LTE connected to an Evolved Packet Core (EPC), New Radio (NR), or LTE connected to a 5G Core Network (5GCN).

In some aspects, attempting to establish the emergency call in a PS domain using the second RAT may be based on at least one or more of configuration information in the mobile communication device, an identity of the first wireless network, an identity of the second wireless network, a country for the first wireless network, a location of the mobile communication device, a cause of failure to establish the emergency call in a PS domain using the first RAT, and a second indication from the first wireless network.

Some aspects may further include receiving a second indication from the first wireless network, in which attempting to establish the emergency call in a PS domain using the second RAT is based at least in part on the second indication from the first wireless network. In some aspects, the second indication may be received from the first wireless network using broadcast or using a Non-Access Stratum (NAS) protocol. In some aspects, the second indication may include an indication that a Circuit Switched (CS) domain is not available.

In some aspects, attempting to establish the emergency call in a PS domain using the second RAT may be based at least in part on a cause of failure to establish the emergency call in a PS domain using the first RAT, and the first indication may include the cause of failure. In some aspects, the cause of failure may indicate a failure for an Access Stratum (AS) or a failure for a NAS.

Some aspects may further include receiving a second indication that the attempt to establish the emergency call in a PS domain using the second RAT has failed, and attempting to establish the emergency call in a CS domain using a third RAT for a third wireless network in response to the second indication.

Various aspects include a communication device including a processor configured with processor-executable instructions to perform operations of any of the methods summarized above. Various aspects also include a non-transitory processor-readable medium on which is stored processor-executable instructions configured to cause a processor of a communication device to perform operations of any of the methods summarized above. Various aspects also include a communication device including means for performing functions of any of the methods summarized above. Various aspects also include a system on chip for use in a communication device that includes a processor configured to perform one or more operations of any of the methods summarized above. Various aspects also include a system in a package that includes two or more systems on chip for use in a communication device that includes a processor configured to perform one or more operations of any of the methods summarized above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
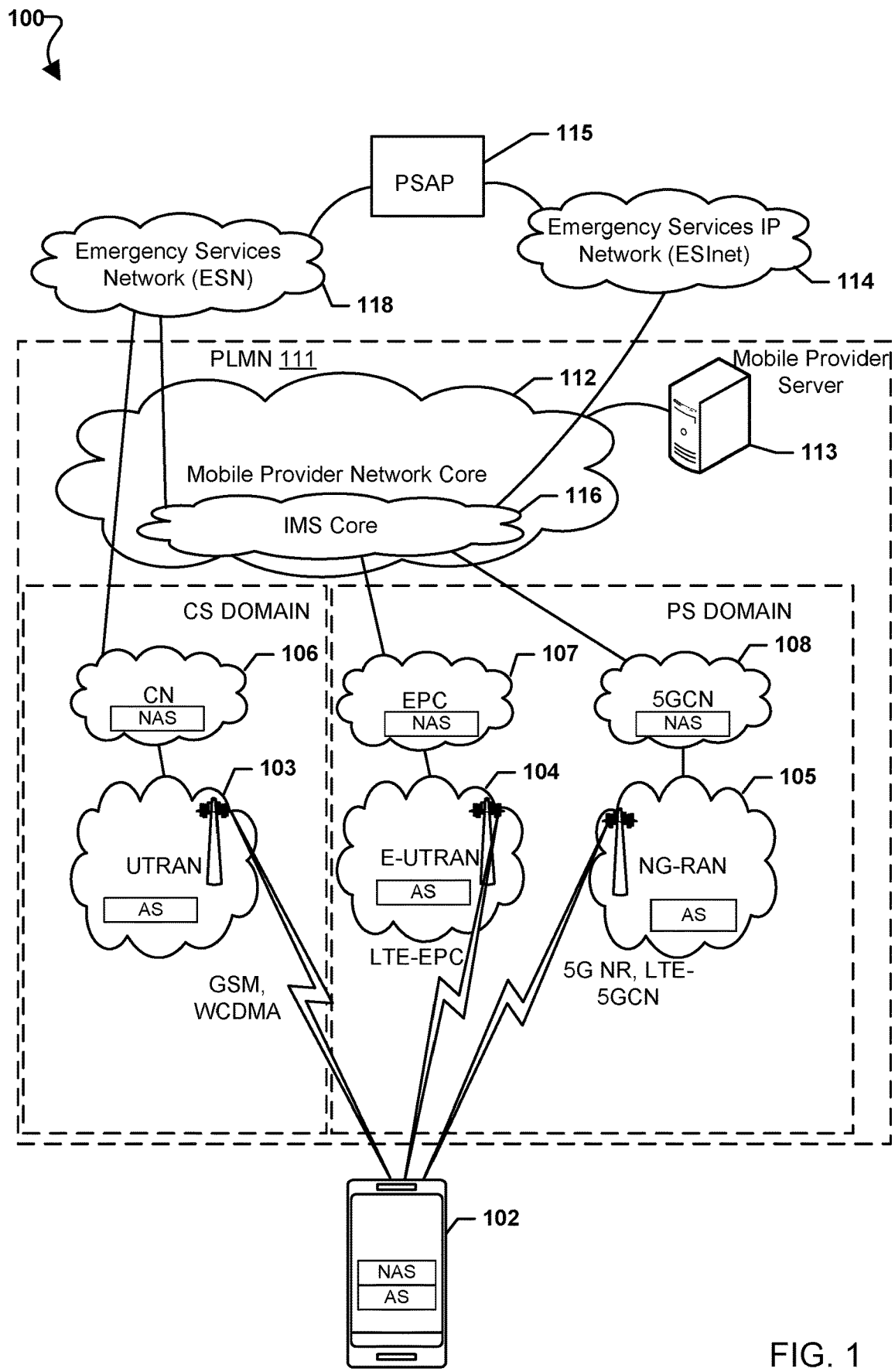
FIG. 1 is a system block diagram conceptually illustrating an example system supporting emergency calls.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "mobile communication device", "communication device", and/or "mobile device" refer to any one or all of cellular telephones, smartphones, portable computing devices, personal or mobile multi-media players, laptop computers, tablet computers, smartbooks, Internet-of-Things (IoT) devices, palm-top computers, wireless electronic mail receivers, multimedia Internet enabled cellular telephones, wireless gaming controllers, display sub-systems, driver assistance systems, vehicle controllers, vehicle system controllers, vehicle communication system, infotainment systems, vehicle telematics systems or subsystems, vehicle display systems or subsystems, vehicle data controllers or routers, and similar electronic devices which include a programmable processor and memory and circuitry configured to perform operations as described herein. Mobile communication devices, communication devices, and/or mobile devices may often be referred to as user equipments (UEs), receiver devices, handsets, etc. While the various aspects are particularly useful for emergency communication systems, the aspects are generally useful in any communication device that includes communication circuitry and a processor that executes application programs.

The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a subsystem processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. An SoC may be an integrated circuits (IC) configured such that the components of the IC reside on the same substrate, such as a single piece of semiconductor material (e.g., silicon, etc.).

The term system in a package (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (e.g., CPU core, IP core, GPU core, etc.) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

As used herein, the terms subscriber identity module (SIM), "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a mobile communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another. A SIM used in various examples may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home Public Land Mobile Number (HPLMN) code, etc.) to indicate the SIM card network operator provider. An Integrated Circuit Card Identity (ICCID) SIM serial number may be printed on the SIM card for identification. However, a SIM may be implemented within a portion of memory of the mobile communication device, and thus need not be a separate or removable circuit, chip or card.

A user may use a subscription on a mobile communication device to make calls. One type of call is an emergency call, such as calls to police, ambulance, or fire departments. Emergency calls are often established between a mobile communication device and a public-safety answering point (PSAP). It is important that emergency calls be successfully completed quickly.

Emergency sessions and emergency calls from mobile communication devices may be supported according to 3rd Generation Partnership Project (3GPP) technical specifications, such as 3GPP; Technical Specification Group Services and System Aspects; IP Multimedia Subsystem (IMS) Emergency Sessions (Release 15) (3GPP TS 23.167 V15.3.0). 3GPP may support emergency calls in the circuit switched (CS) domain and/or the packet switched (PS) domain. Different radio access technologies (RATs) may operate in the CS domain and the PS domain. CS domain RATs may include global system for mobile communications (GSM), code division multiple access (CDMA) 2000 systems, Wideband CDMA (WCDMA), etc. PS domain RATs may include 5G New Radio (5G NR), long term evolution via a 5G core network (LTE-5GCN), long term evolution via an evolved packet core (EPC) network (LTE-EPC), etc.

The CS domain provides a reliable emergency call service and may be less prone to errors than PS domain emergency calls. However, the CS domain is gradually being phased out, which will lead to growing areas with no CS coverage. Accordingly, when a mobile communication device attempts to place an emergency call in the CS domain when no CS coverage is present, the mobile communication device may waste valuable time attempting to connect an emergency call that will fail as there is no CS coverage.

Many mobile communication devices support attempting emergency calls using different RATs in different domains. For example, a communication device may support attempting an emergency call in the PS domain using a 5G-NR RAT, an LTE-5GCN RAT (in which LTE wireless access may be provided to a 5G core network (5GCN)), and/or an LTE-EPC RAT (in which LTE wireless access may be provided to an enhanced packet core (EPC) network). Additionally, a mobile communication device may support attempting an emergency call in the CS domain using a WCDMA RAT. When a mobile communication device supports establishing an emergency call in at least two different RATs, an emergency call attempted to be established in the PS domain using a first RAT may succeed if later attempted to be established in the PS domain using a different RAT. For example, an emergency call whose attempt failed using 5G-NR, may succeed if subsequently attempted using LTE-5GCN or LTE-EPC. Especially when the initial failure is due to a problem at the access stratum (AS) level or non-access stratum (NAS) level associated with a first RAT, a second attempt in the PS domain using a different RAT would likely succeed. Allowing a mobile communication device to make a second emergency call attempt with a different RAT in the PS domain after an unsuccessful first PS domain emergency call attempt may therefore be useful. When there is no CS domain coverage, re-attempting an emergency call in the PS domain with a different RAT may save time in connecting the emergency call and prevent users from ending the emergency call prematurely because the call does not connect within a few seconds time. For example, when there is no CS domain coverage, attempting an emergency call in the CS domain may cause the mobile communication device to wait a time period, such as five or more seconds while the CS domain call is attempted. During that wait time, a user may disconnect (or attempt to disconnect) the call due to frustration or an improper understanding that the emergency call is still being attempted by the network. Avoiding attempting an emergency call in the CS domain when other RATs in the PS domain are available may prevent that wasted time of attempting a CS domain emergency call when there is no CS domain coverage.

Systems, methods, and devices of the various aspects may enable a mobile communication device to make a second emergency call attempt in a PS domain in response to determining that a first emergency call attempt in another PS domain failed. The various aspects may enable a second emergency call attempt in a PS domain without requiring the mobile communication device to attempt an emergency call in a CS domain in response to determining that a first emergency call attempt in a PS domain failed. In various embodiments, a second attempt in a PS domain using a RAT that is different from the RAT used for a first attempt for the same emergency call in the PS domain may be performed before any CS domain attempt for the emergency call is made. In various embodiments, the second attempt in the PS domain using the different RAT may be an attempt to establish the emergency call using a same subscription as was used for the first attempt in the PS domain. In various embodiments, the different RATs operating in the PS domain for the different emergency call attempts may be operating in normal mode during each attempt of the same emergency call.

In various embodiments, a processor of a mobile communication device may be configured to determine whether one or more different PS domain RATs are available for attempting an emergency call. For example, the processor of the mobile communication device may determine the type of radio frequency (RF) resources available and/or the capabilities of the attached network to determine whether one or more different PS domain RATs are available. The different RATs may include one or more of a 5G-NR RAT, a LTE-5GCN RAT, and/or a LTE-EPC RAT. In various embodiments, the processor of the mobile communication device may select one of the different available PS domain RATS as the second RAT. In various embodiments, the second RAT may be selected based on user preferences, network settings, device conditions, Quality of Service measurements on the different RATs, or any other criteria that may be used to select among the available RATs. The second RAT may be used to attempt to establish the emergency call in the PS domain in response to determining that a first attempt to establish the emergency call in the PS domain with a first RAT failed. For example, a LTE-5GCN RAT may be selected as the second RAT when the emergency call initially failed using a 5G-NR RAT. As a further example, a LTE-EPC RAT may be selected as the second RAT when the emergency call initially failed using a 5G-NR RAT. As another example, a LTE-5GCN RAT may be selected as the second RAT when the emergency call initially failed using a LTE-EPC RAT. As a further example, a 5G-NR RAT may be selected as the second RAT when the emergency call initially failed using a LTE-EPC RAT. As another example, a LTE-EPC RAT may be selected as the second RAT when the emergency call initially failed using a LTE-5GCN RAT. As a further example, a 5G-NR RAT may be selected as the second RAT when the emergency call initially failed using a LTE-5GCN RAT.

In various embodiments, a network emergency retry setting may indicate whether or not the modem should use a PS domain for a second emergency call attempt. In various embodiments, the network emergency retry setting may be a setting controlled by a network entity. For example, the network emergency retry setting may indicate whether or not a CS domain is present in a geographic area. A network entity may determine whether a CS domain is present and may send a message to a mobile communication device indicating whether a CS domain is present. When a CS domain is indicated as not present in the network emergency retry setting, the mobile communication device may use a PS domain to re-attempt an emergency call in response to a first attempt at the emergency call failing in the PS domain. In some embodiments, the network emergency retry setting may be a setting controlled by the mobile communication device.

In various embodiments, a processor of a mobile communication device (e.g., a processor within the modem) may be configured to determine whether a mobile communication device condition supports using a PS domain for a second emergency call attempt. As examples, mobile communication device conditions may include one or more of a current location of the mobile communication device, a network identity of a network to which the mobile communication device is currently attached, a network identify of another network, a country of a network, a setting of the mobile communication device, an operating mode of the mobile communication device, etc. As a specific example, in a geographic area known to have sporadic or no CS domain coverage, the mobile communication device condition may support using a PS domain for a second emergency call attempt. As another specific example, the mobile communication device may recognize a network identity of an attached network as a network in which the PS domain should be used for a second emergency call attempt.

In various embodiments, the processor of the mobile communication device may determine a reason the first attempt to establish an emergency call in a PS domain using a first RAT failed. For example, the processor may determine that the initial failure is due to a problem at the AS level, NAS level, or other level of the wireless protocol stacks. In various embodiments, the reasons for call failure may be associated with using a PS domain for a second emergency call attempt and/or not using a PS domain for a second emergency call attempt. For example, failures at the AS level and NAS level may be associated with using a PS domain for a second emergency call attempt, while failures at other levels may not be associated with using a PS domain for a second emergency call attempt. In response to determining the reason for call failure is associated with using a PS domain for a second emergency call attempt, the processor may use a PS domain RAT to reattempt the emergency call.

In some embodiments, in response to a subsequent PS domain emergency call attempt failing, the mobile communication device may attempt to establish the emergency call in the CS domain. In some embodiments, after a subsequent PS domain emergency call attempt failing, the mobile communication device may attempt to establish the emergency call using other additional PS domain RATs. For example, the mobile communication device may attempt to use three or more different RATs in the PS domain to establish the emergency call.

FIG. 1 illustrates an example system 100 suitable for implementing various embodiments. The system 100 may support a mobile communication device 102 performing emergency calls. The system 100 may enable emergency calls from the mobile communication device 102 to be established with a public-safety answering point (PSAP) 115 connected to an emergency services Internet Protocol (IP) network (ESInet) 114 using IP based signaling and/or to an emergency services network (ESN) 118 using CS based signaling. For example, the system 100 may support emergency sessions for the mobile communication device 102 according to 3rd Generation Partnership Project (3GPP) technical specifications, such as 3GPP; Technical Specification Group Services and System Aspects; IP Multimedia Subsystem (IMS) Emergency Sessions (Release 15) (3GPP TS 23.167 V15.3.0).

The mobile communication device 102 may establish one or more connections with a public land mobile network (PLMN) 111. The mobile communication device 102 may include at least one subscription supporting service in the PLMN 111. The PLMN 111 may include a mobile provider network core 112 connected to different core networks and associated access networks enabling connections to mobile provider network core 112 to be established by the mobile communication device 102 using different radio access technologies (RATs). The mobile provider network core 112 may include one or more types of physical and/or logical networks to support circuit switched (CS) domain and/or packet switched (PS) domain services in the PLMN 111, such as an IMS core 116. The PLMN 111 may connect to the ESInet 114, such as via connections between the mobile provider network core 112 and the ESInet 114 (e.g., via connections between the IMS core 116 and ESInet 114), to support establishing emergency calls to the PSAP 115 using IP based signaling. The PLMN 111 may connect to the ESN 118, such as via connections between the mobile provider network core 112 and the ESN 118 (e.g., via connections between the IMS core 116 and ESN 118), to support establishing emergency calls to the PSAP 115 using CS based signaling. Some RATs supported in the PLMN 111 may be circuit switched (CS) domain RATs, such as GSM, WCDMA, etc., while other RATs supported in the PLMN 111 may be packet switched (PS) domain RATs, such as 5G-NR, LTE-5GCN, LTE-EPC, IEEE 802.11 WiFi (also referred to as Wi-Fi and not shown in FIG. 1), etc. While the PLMN 111 is illustrated as supporting both CS domain RATs and PS domain RATs, CS domain RATs may not be supported in any given PLMN 111 and/or in specific portions of any given PLMN 111. In some implementations, one or more PS RATs shown in, or described herein, for FIG. 1 may not be present.

As a specific example, to support the provisioning of a CS domain RAT, one or more Universal Mobile Telecommunications Service (UMTS) Terrestrial Radio Access Networks (UTRAN) 103 may be connected to one or more Core Networks (CNs) 106 connected to the mobile provider network core 112. Via the UTRANs 103, CNs 106, and mobile provider network core 112, the PLMN 111 may support CS domain RATs (e.g., WCDMA, etc.) being used to establish an emergency call in the CS domain by the mobile communication device 102 to an ESN 118 connecting the mobile provider network core 112 to the PSAP 115.

As another specific example, to support the provisioning of a PS domain RAT, one or more Evolved-UTRANs (E-UTRANs) 104 may be connected to one or more Evolved Packet Cores (EPC) 107 connected to the mobile provider network core 112. Via the E-UTRANs 104, EPCs 107, and mobile provider network core 112, the PLMN 111 may support PS domain RATs (e.g., LTE-EPC, etc.) being used to establish an emergency call by the mobile communication device 102 to either an ESInet 114 connecting the mobile provider network core 112 to the PSAP 115 using IP based signaling or to an ESN 118 connecting the mobile provider network core 112 to the PSAP 115 using CS based signaling.

As a further specific example, to support the provisioning of a PS domain RAT, one or more Next Generation Radio Access Networks (NG-RANs) 105 may be connected to one or more 5G Core Networks (5GCNs) 108 connected to the mobile provider network core 112. Via the NG-RANs 105 and 5GCNs 108, and mobile provider network core 112, the PLMN 111 may support PS domain RATs (e.g., LTE-5GCN, 5G NR, etc.) being used to establish an emergency call by the mobile communication device 102 to an ESInet 114 connecting the mobile provider network core 112 to the PSAP 115 using IP based signaling or to an ESN 118 connecting the mobile provider network core 112 to the PSAP 115 using CS based signaling.

E-UTRAN 104 in FIG. 1 may support a Long Term Evolution (LTE) RAT for the PS domain. NG-RAN 105 in FIG. 1 may support an LTE RAT for the PS domain using one or more next generation evolved Node Bs (ng-eNBs) in NG-RAN 105 (not shown in FIG. 1). NG-RAN 105 may also or instead support a Fifth Generation (5G) Next Generation (NR) RAT for the PS domain using one or more NR Node Bs (also referred as "gNBs") in NG-RAN 105 (not shown in FIG. 1).

In various aspects, the mobile communication device 102 may be configured to establish calls using different RATs. For example, the mobile communication device 102 may be configured to establish 5G-NR calls, LTE-5GCN calls, LTE-EPC calls, GSM calls, and/or WCDMA calls. In various aspects, the mobile communication device 102 may be configured to attempt emergency calls in a CS domain using one or more RATs and/or in a PS domain using one or more RATs.

In various aspects, a mobile provider server 113 connected to the mobile provider network core 112 may generate and send messages to the mobile communication device 102 via the PS domain and/or the CS domain to control which domains (e.g., PS domain, CS domain, PS and CS domains, etc.) the mobile communication device 102 uses for attempting emergency calls.

In various aspects, the system 100 may include various software architectures and layered radio protocol stacks at both the mobile communication device 102 and in the PLMN 111 to support performing emergency calls. For example, the architectures and stacks may include a Non Access Stratum (NAS) and an Access Stratum (AS). For example, on the network side, the distribution of the NAS and AS protocol layers may be such that the AS functionality may be provided in the access networks (e.g., UTRAN 103, E-UTRAN 104, NG-RAN 105, etc.) and the NAS functionality may be provided in the core networks (e.g., CN 106, EPC 107, 5GCN 108, etc.). For example, on the mobile communication device side, the NAS and AS protocol layers may be implemented in one or more modem stacks of the mobile communication device 102. In various aspects, the access networks (e.g., UTRAN 103, E-UTRAN 104, NG-RAN 105, etc.) and/or the core networks (e.g., CN 106, EPC 107, 5GCN 108, etc.) may send indications of reasons that an emergency call failed, such as indications of a failure due to a problem at the AS level, NAS level, or other level, etc., of the wireless protocol stacks, to the mobile communication device 102.

Figure 2:
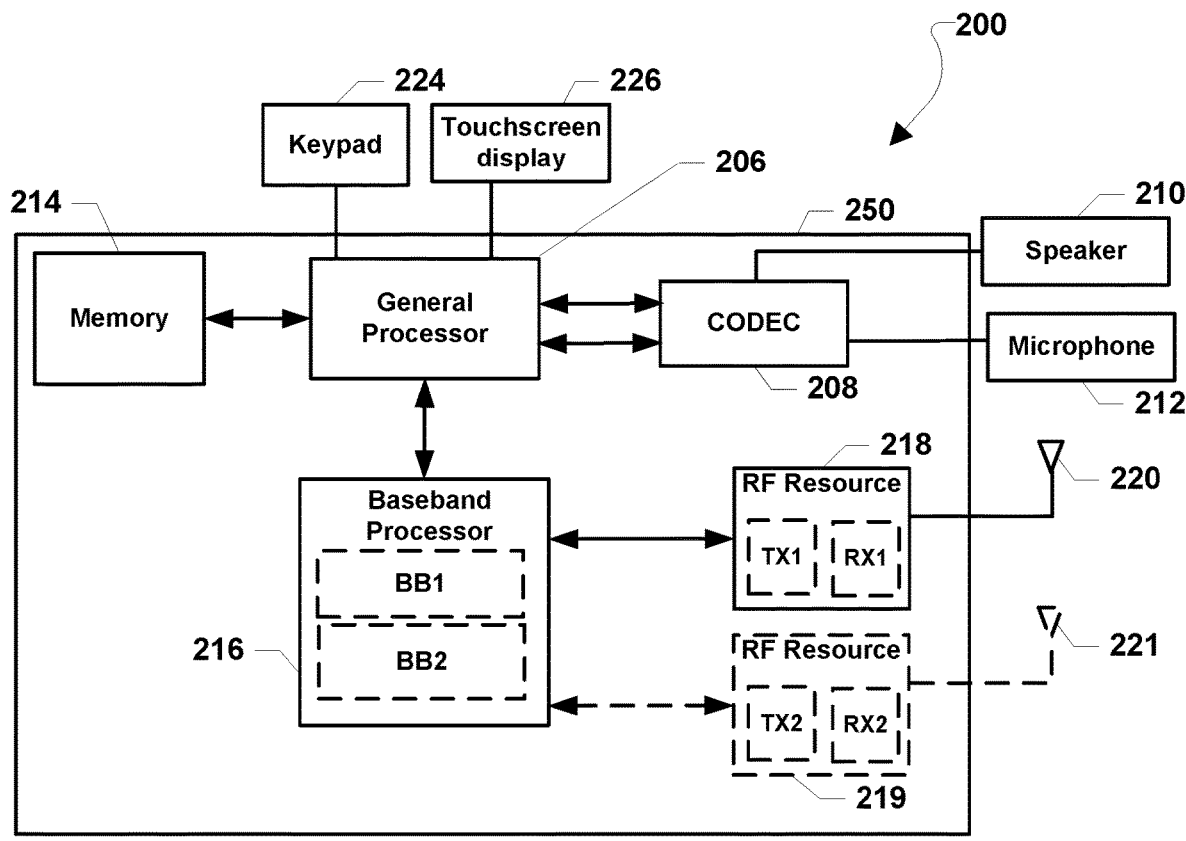
FIG. 2 is a component block diagram of a multi-SIM mobile communication device according to various examples.

FIG. 2 is a functional block diagram of a mobile communication device 200 suitable for implementing various aspects. With reference to FIGS. 1-2, the mobile communication device 200 may be similar to the mobile communication device 102 as described with reference to FIG. 1. The mobile communication device 200 may include one or more SIMs associated with one or more different subscriptions.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data though a corresponding baseband-RF resource chain. The memory 214 may store an operating system (OS), as well as user application software and executable instructions.

The general processor 206 and the memory 214 may each be coupled to at least one baseband modem processor 216. Each RAT supported by the mobile communication device 200 may be associated with a baseband-RF resource chain. A baseband-RF resource chain may include the baseband modem processor 216, which may perform baseband/modem functions for communications with/controlling a RAT supported by the mobile communication device 200, and may include one or more amplifiers and radios, referred to generally herein as RF resources (e.g., RF resource 218, 219). In some examples, baseband-RF resource chains may share the baseband modem processor 216 (i.e., a single device that performs baseband/modem functions for all RATs on the mobile communication device 200). In other examples, each baseband-RF resource chain may include physically or logically separate baseband processors (e.g., BB1, BB2).

The RF resource 218 may be a transceiver that performs transmit/receive functions for each of the RATs supported by the mobile communication device 200. The RF resource 218 may include separate transmit and receive circuitry, or may include a transceiver that combines transmitter and receiver functions. In some examples, the RF resource 218 may include multiple receive circuitries. The RF resource 218 may be coupled to a wireless antenna (e.g., a wireless antenna 220). The RF resource 218 may also be coupled to the baseband modem processor 216. In some optional examples, the mobile communication device 200 may include one or more additional optional RF resources 219 configured similarly to the RF resource 218 and coupled to one or more optional wireless antennas 221. Each RF resource 218, 219 and antenna 220, 221 may support one of more different RATs, such as 5G-NR, LTE-5GCN, LTE-EPC, WCDMA, etc. Via the RF resources 218, 219 and the baseband modem processor 216 the mobile communication device 200 may establish emergency calls in the PS domain and/or in the CS domain using different RATs.

In some examples, the general processor 206, the memory 214, the baseband processor(s) 216, and the RF resources 218, 219 may be included in the mobile communication device 200 as a SIP 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them, as is known in the art.

Figure 3:
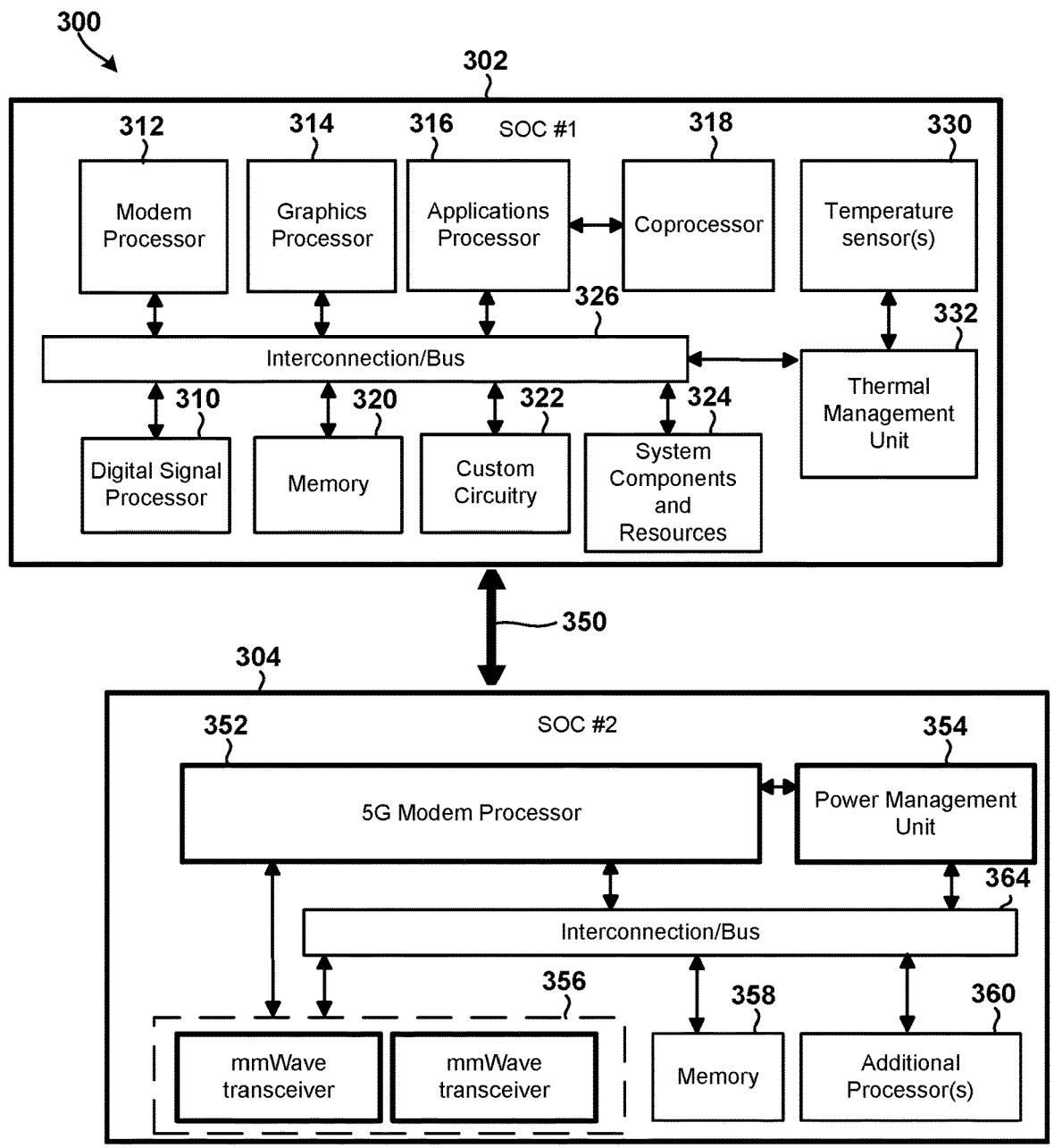
FIG. 3 is a component block diagram illustrating a communication device that may be configured to implement methods for performing an emergency call in accordance with various embodiments.

The various embodiments may be implemented on a number of single processor and multiprocessor communication devices, including an SoC and/or an SIP. FIG. 3 illustrates an example SIP 300 architecture that may be configured to implement methods for establishing emergency calls in accordance with various embodiments. With reference to FIGS. 1-3, example SIP 300 architecture may be implemented in any SIP, (e.g., SIP 250) and may be used in any mobile communication device (e.g., mobile communication device 102, mobile communication device 250, etc.) implementing various embodiments.

In the example illustrated in FIG. 3, the SIP 300 includes two SoCs 302, 304. In some embodiments, the first SoC 302 may operate as a central processing unit (CPU) of the communication device that carries out the instructions of software application programs by performing the arithmetic, logical, control and input/output (I/O) operations specified by the instructions. In some embodiments, the second SoC 304 may operate as a specialized processing unit. For example, the second SoC 304 may operate as a specialized 5G processing unit responsible for managing high volume, high speed (e.g., 5 Gbps, etc.), and/or very high frequency short wave length (e.g., 28 GHz mmWave spectrum, etc.) communications to support 5G NR functionality with an air interface based on orthogonal frequency-division multiplexing (OFDM). The SoCs and organization of functionality illustrated in FIG. 3 are a non-limiting example of an SIP as other architectures and organizations of functionality among SoCs, including fewer or more SoCs, are contemplated.

In the example illustrated in FIG. 3, the first SoC 302 includes a digital signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, one or more temperature sensors 330, and a thermal management unit 332. The second SoC 304 includes a 5G modem processor 352, a power management unit 354, an interconnection/bus module 364, a plurality of mmWave transceivers 356, memory 358, and various additional processors 360, such as an applications processor, packet processor, etc. Each processor 310, 312, 314, 316, 318, 352, 360 may include one or more cores, and each processor/core may perform operations independent of the other processors/cores. For example, the first SoC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SoCs 302, 304 may include various system components, resources and custom circuitry for managing sensor data, analog-to-digital conversions, wireless data transmissions, and for performing other specialized operations, such as decoding data packets and processing encoded audio and video signals for rendering in a web browser or other display application. For example, the system components and resources 324 of the first SoC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, wireless communication devices, external memory chips, display systems, buses, etc.

The first and second SoCs 302, 304 may communicate via one or more interconnection/bus modules 350. The processors 310, 312, 314, 316, 318 may be interconnected to one or more memory elements 320, system components and resources 324, and custom circuitry 322, and a thermal management unit 332 via an interconnection/bus module 326. Similarly, the processors 352, 360 may be interconnected to the power management unit 354, the mmWave transceivers 356, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 302, 304 may further include an input/output module (not illustrated) for communicating with resources external to the SoCs. Resources external to the SoCs may be shared by two or more of the internal SoC processors/cores.

In addition to the SIP 300 discussed above, the various aspects may be implemented in a wide variety of communication devices, which may include a single processor, multiple processors, multicore processors, or any combination thereof.

Figure 4A:
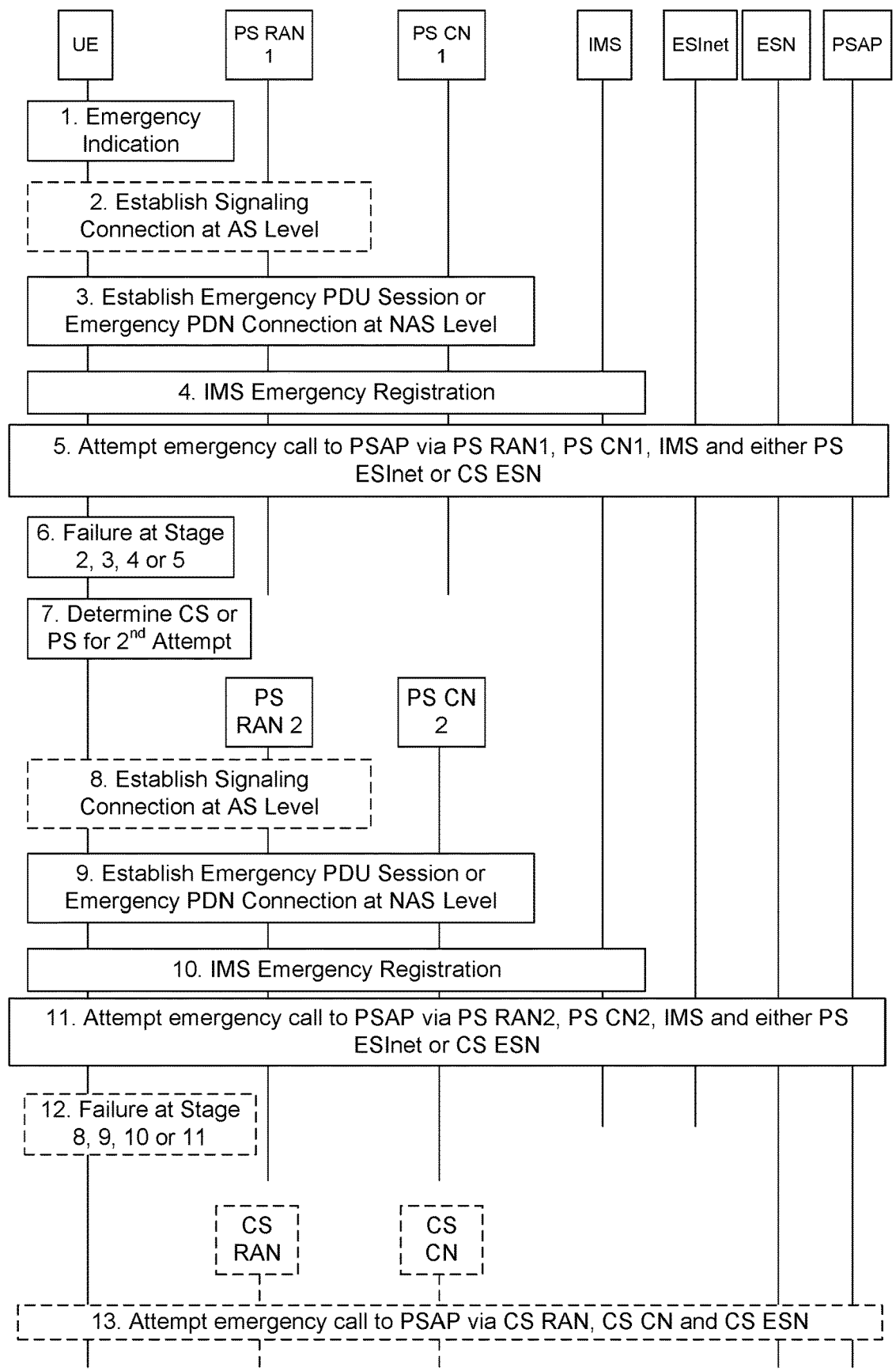
FIG. 4A is a signaling flow diagram illustrating a method for performing an emergency call according to various embodiments

FIG. 4A illustrates signaling between a mobile device (user equipment (UE)), a PS Radio Access Network 1 (PS RAN 1), a PS CN 1, an IMS, an ESInet, an ESN, a PSAP, a PS RAN 2, a PS CN 2, a CS RAN and a CS CN. With reference to FIGS. 1-4A, the signaling illustrated in FIG. 4A may enable the performance of an emergency call according to various embodiments. PS RAN 1 and PS CN 1 may correspond, respectively, to E-UTRAN 104 and EPC 107 in FIG. 1, or to NG-RAN 105 and 5GCN 108 in FIG. 1. PS RAN 2 and PS CN 2 may correspond, respectively, to E-UTRAN 104 and EPC 107 in FIG. 1, or to NG-RAN 105 and 5GCN 108 in FIG. 1, and may both differ from PS RAN 1 and PS CN 1, respectively. CS RAN and CS CN in FIG. 4A may correspond, respectively, to UTRAN 103 and CN 106 in FIG. 1. The ESN and ESInet in FIG. 4A may correspond, respectively, to ESN 118 and ESInet 114 in FIG. 1. The UE in FIG. 4A may correspond to the mobile communication device 102 in FIG. 1. The PSAP in FIG. 4A may correspond to PSAP 115 in FIG. 1.

At stage 1 in FIG. 4A, the UE receives an emergency indication. The emergency indication may correspond to the dialing of an emergency number (e.g. "911" or "112") by a user of the UE, some other indication of an emergency call or an automatic detection of an emergency condition (e.g., a medical condition for a user of the UE or a fire in a building). In response to receiving the emergency indication, the UE determines to establish an emergency call and determines to use the PS domain for a first attempt to establish the emergency call (e.g., because the UE is already attached to or registered with PS RAN 1 and PS CN 1). The UE also determines a particular RAT for the PS domain and an associated radio access network (RAN) in which to attempt the emergency call. In the example in FIG. 4A, the UE determines to use PS RAN 1 and PS CN 1. This may imply attempting the emergency call using an LTE RAT connected to EPC when PS RAN 1 and PS CN 1 correspond to E-UTRAN 104 and EPC 107, respectively. This may instead imply attempting the emergency call using an LTE RAT connected to 5GCN when PS RAN 1 and PS CN 1 correspond to NG-RAN 105 and 5GCN 108, respectively, and when the UE accesses an ng-eNB in the NG-RAN 105. This may further imply attempting the emergency call using an NR RAT when PS RAN 1 and PS CN 1 correspond to NG-RAN 105 and 5GCN 108, respectively, and when the UE accesses a gNB in the NG-RAN 105.

At stage 2 in FIG. 4A, which is optional, the UE may send a request to PS RAN 1 to establish a signaling connection at an Access Stratum (AS) level to PS RAN 1 using the RAT determined at stage 1. Stage 2 may be omitted if the UE already has a signaling connection to PS RAN 1.

At stage 3 in FIG. 4A, the UE may send a request to PS CN 1 (via PS RAN 1) to register with or attach to PS CN 1 at a Non-Access Stratum (NAS) level (e.g., if not yet attached to or registered with PS CN 1). The UE may then send a request to PS CN 1 at the NAS level to either establish an emergency Packet Data Network (PDN) connection (e.g., if PS CN 1 corresponds to EPC 107) or an emergency Packet Data Unit (PDU) session (e.g. if PC CN 1 corresponds to 5GCN 108).

At stage 4 in FIG. 4A, the UE sends a request to the IMS (via PS RAN 1 and PS CN 1) to perform an IMS emergency registration.

At stage 5 in FIG. 4A, the UE sends a request (e.g., a Session Initiation Protocol INVITE message) to the IMS (e.g., via PS RAN 1 and PS CN 1) to request the IMS to attempt to establish an emergency call with a PSAP. As part of stage 5, the IMS may attempt to establish the emergency call with the PSAP using CS based signaling via ESN 118 or using IP based signaling via ESInet 114. If the emergency call is successfully established with the PSAP, the remaining stages in FIG. 4A are skipped.

At stage 6, if the first attempt to establish the emergency call fails, the UE may determine a failure at any of stages 2, 3, 4 or 5. For a failure at stage 2, the UE may receive a failure indication and/or failure cause indicating or implying a failure to establish a signaling connection at the AS level and may then skip stages 3-5. For a failure at stage 3, the UE may receive a failure indication and/or failure cause indicating or implying a failure to perform a registration or attachment or to establish an emergency PDN connection or emergency PDU session at the NAS level and may then skip stages 4-5. For a failure at stage 4, the UE may receive a failure indication and/or failure cause indicating or implying a failure to perform an IMS emergency registration at the IMS level and may then skip stage 5. For a failure at stage 5, the UE may receive a failure indication and/or failure cause indicating or implying a failure to establish an emergency call with a PSAP at the IMS, ESN, ESInet or PSAP level. In some cases, a failure indication and/or failure cause may be received by the UE after stage 2 and associated with the AS level or after stage 3 and associated with the NAS level.

At stage 7, the UE determines whether to make a second attempt to establish the emergency call using the PS domain or CS domain. In some embodiments, if the failure (e.g. failure cause) is associated with the AS level (e.g., occurs at stage 2) or is associated with the NAS level (e.g., occurs at stage 3), the UE may determine to use the PS domain for the second attempt because use of a different PS RAN and different PS CN may avoid a recurrence of the same failure. Conversely, if the failure is associated with the IMS level, ESN level, ESInet level or PSAP level (e.g., occurs at stage 4 or stage 5), the UE may determine to use the CS domain because the CS domain may avoid use of the IMS and/or use of the ESInet if stage 5 occurred using the ESInet. Determination to use the PS domain or CS domain at stage 7 may also be based on an indication received from PS RAN 1 or PS CN 1 (e.g., as part of stage 2 or stage 3 and possibly received via broadcast if received from PS RAN 1 or received using NAS if received from PS CN 1) indicating that use of the CS domain is or is not required (e.g., use of the CS domain may not be required and may even be prohibited if there is no CS coverage at the location of the UE). The UE may also determine a particular RAT when the PS domain is determined at stage 7; the PS RAT may be different than the PS RAT determined as part of stage 1 (e.g. if NR is determined at stage 1, LTE connected to EPC or LTE connected to 5GCN may be determined as part of stage 7).

If the UE determines to use the PS domain at stage 7 for a second attempt to establish the emergency call, the UE performs one or more of stages 8-11 using PS RAN 2 and PS CN 2. Stages 8-11 may be identical or similar to stages 2-5 with PS RAN 2 replacing PS RAN 1 and PS CN 2 replacing PS CN 1. If the second attempt to establish the emergency call fails (e.g., due to a failure at stage 8, 9, 10, or 11), the UE may make a third attempt to establish the emergency call using the CS domain at stage 13.

If the UE determines to use the CS domain at stage 7 for a second attempt to establish the emergency call, the UE performs stage 13 to attempt to establish the emergency call using the CS RAN and CS CN.

Figure 4B:
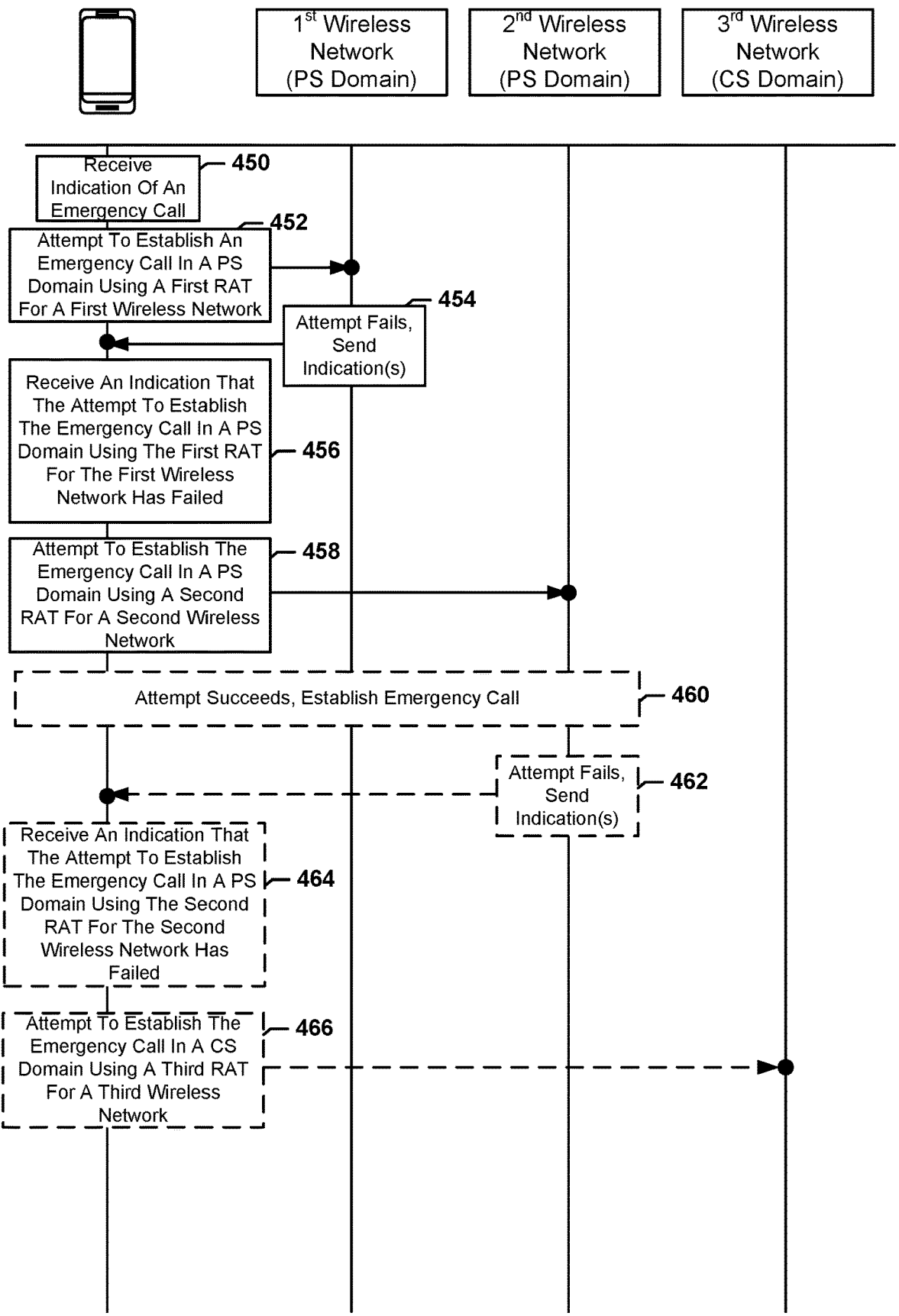
FIG. 4B is a process flow diagram illustrating a method for performing an emergency call according to various embodiments.

FIG. 4B illustrates interactions between a mobile device (e.g., mobile communication device 102, mobile communication device 200, SIP 300, etc.) and a first wireless network in a PS domain (e.g., a wireless network including NG-RAN 105 and 5GCN 108, a wireless network including E-UTRAN 104 and EPC 107, etc.), a second wireless network in a PS domain (e.g., a wireless network including NG-RAN 105 and 5GCN 108, a wireless network including E-UTRAN 104 and EPC 107, etc.), and a third wireless network in a CS domain (e.g., a wireless network including UTRAN 103 and CN 106, etc.). With reference to FIGS. 1-4B, the interactions illustrated in FIG. 4B may enable the performance of an emergency call according to various embodiments. In some embodiments, two or more of the first wireless network, second wireless network, and third wireless network may be wireless networks of the same wireless network operator. In various embodiments, the mobile device may include at least a first RAT and a second RAT. In some embodiments, the first RAT and the second RAT may be different RATs. As examples, the first RAT and the second RAT may include Long Term Evolution (LTE) connected to an Evolved Packet Core (EPC), New Radio (NR), or LTE connected to a 5G Core Network (5GCN).

In operation 450, the mobile device may receive an indication of an emergency call. For example, the user may initiate an emergency call by dialing a pre-defined emergency number on the mobile device. As examples, the emergency indication may correspond to the dialing of an emergency number (e.g., "911" or "112") by a user of the mobile device, some other indication of an emergency call, or an automatic detection of an emergency condition (e.g., a medical condition for a user of the mobile device).

In operation 452, the mobile device may attempt to establish an emergency call in a PS domain using a first RAT for a first wireless network. For example, the mobile device may attempt to establish an emergency call in a PS domain using a 5G-NR RAT, an LTE connected to 5GCN (LTE-5GCN) RAT, or an LTE connected to EPC (LTE-EPC) RAT. As a specific example, the first wireless network may be a 5G-NR network (e.g., may include or correspond to NG-RAN 105 and 5GCN 108) and the mobile device may attempt to establish an emergency call in a PS domain with the first wireless network using a 5G-NR RAT (e.g., as described for stages 2-5 for FIG. 4A). In some embodiments, the mobile device may be in a normal service state for the first wireless network, wherein the mobile device is subscribed for voice and/or data services with the first wireless network. In some embodiments, the mobile device may be in a limited service state for the first wireless network, wherein the mobile device is not subscribed for voice and/or data services with the first wireless network but is allowed to establish an emergency call.

In operation 454, the attempt to establish the emergency call in a PS domain using the first RAT for the first wireless network may fail (e.g., as described for stage 6 in FIG. 4A) and the first wireless network may send one or more indications to the mobile device. In some embodiments, the first wireless network may send a first indication. For example, a first indication that may be sent by the first wireless network may be an indication that the attempt to establish the emergency call in a PS domain using the first RAT for the first wireless network has failed. In some embodiments, the first indication may additionally indicate a cause of failure of the attempt to establish the emergency call. As examples, the cause of failure may indicate a failure for an Access Stratum (AS) or a failure for a Non-Access Stratum (NAS), such as described for stage 6 for FIG. 4A. In some embodiments, the first wireless network may send one or more additional indications in addition to the first indication. In some embodiments, a second indication from the first wireless network may be an indication that a Circuit Switched (CS) domain is not available. In various embodiments, the second indication may be sent by the first wireless network using broadcast and/or a NAS protocol.

In operation 456, the mobile device may receive the indication that the attempt to establish the emergency call in a PS domain using the first RAT for the first wireless network has failed. In some embodiments, the indication that the attempt to establish the emergency call in a PS domain using the first RAT for the first wireless network has failed may include a cause of failure. As examples, the cause of failure may indicate a failure for an AS (or AS level) or a failure for a NAS (or NAS level). Additionally, the mobile device may receive one or more other indications, such as a second indication that a CS domain is not available or any other type indication. In various embodiments, the second indication may be received by the mobile device using broadcast and/or an NAS protocol.

In operation 458, the mobile device may attempt to establish the emergency call in a PS domain using a second RAT for a second wireless network, such as described for stages 8-11 for FIG. 4A. For example, in response to the first indication, the mobile device may attempt to establish the emergency call in a PS domain using the second RAT for the second wireless network. The second RAT may be different than the first RAT used in operation 452. For example, the mobile device may attempt to establish an emergency call in a PS domain using a 5G-NR RAT, a LTE-5GCN RAT, or a LTE-EPC RAT that is different than the RAT used in operation 452. As a specific example, when the first wireless network is a 5G-NR network and the second wireless network is a LTE-EPC network, the mobile device may attempt to establish an emergency call in a PS domain with the second wireless network using a LTE-EPC RAT in response to the attempt using the 5G-NR RAT failing. In various embodiments, the attempt to establish the emergency call in a PS domain using the second RAT may be based on at least one of configuration information in the mobile device, an identity of the first wireless network, an identity of the second wireless network, a country for the first wireless network, a location of the mobile device, a cause of the failure to establish the emergency call in a PS domain using the first RAT, the second indication from the first wireless network, or some combination of these. As a specific example, the attempt to establish the emergency call in a PS domain using the second RAT may be based on the second indication from the first wireless network, and the second indication may be received from the first wireless network using broadcast or using a NAS protocol. As another specific example, the attempt to establish the emergency call in a PS domain using the second RAT may be based on the cause of the failure to establish the emergency call in a PS domain using the first RAT and the first indication received by the mobile device may indicate the cause of failure.

The second attempt to establish the emergency call in a PS domain using the second RAT for the second wireless network may succeed or fail. In response to the attempt succeeding, the mobile device and second network may establish the emergency call using the second RAT in operation 460. In response to the attempt to establish the emergency call in a PS domain using the second RAT for the second wireless network failing, the second wireless network may send one or more indications to the mobile device in operation 462. In some embodiments, the second wireless network may send a first indication. For example, a first indication that may be sent by the second wireless network may be an indication that the attempt to establish the emergency call in a PS domain using the second RAT for the second wireless network has failed. In some embodiments, the second indication may additionally indicate a cause of failure of the attempt to establish the emergency call. As examples, the cause of failure may indicate a failure for an AS (or AS level) or a failure for a NAS (or NAS level). In some embodiments, the second wireless network may send one or more additional indications in addition to the first indication. In some embodiments, a second indication from the second wireless network may be an indication that a CS domain is not available. In various embodiments, the second indication may be sent by the second wireless network using broadcast and/or a NAS protocol.

In operation 464, the mobile device may receive the indication that the attempt to establish the emergency call in a PS domain using the second RAT for the second wireless network has failed. In some embodiments, the indication that the attempt to establish the emergency call in a PS domain using the second RAT for the second wireless network has failed may include a cause of failure. As examples, the cause of failure may indicate a failure for an AS or a failure for a NAS. Additionally, the mobile device may receive one or more other indications, such as a second indication that a CS domain is not available or any other type indication. In various embodiments, the second indication may be received by the mobile device using broadcast and/or a NAS protocol.

In operation 466, the mobile device may attempt to establish the emergency call in a CS domain using a third RAT for a third wireless network, such as described for stage 13 of FIG. 4A. For example, in response to the indication from the second wireless network, the mobile device may attempt to establish the emergency call in a CS domain using the third RAT for the third wireless network. The third RAT may be different than the first RAT used in operation 452 and the second RAT used in operation 458. For example, the mobile device may attempt to establish an emergency call in a CS domain using a GSM RAT or WCDMA RAT that is different than the RAT used in operations 452, 458. As a specific example, when the first wireless network is a 5G-NR network, the second wireless network is an LTE-EPC network, and the third wireless network is a WCDMA network, the mobile device may attempt to establish an emergency call in a CS domain with the third wireless network using a WCDMA RAT in response to the attempts using the 5G-NR RAT and LTE-EPC RAT failing.

Figure 4C:
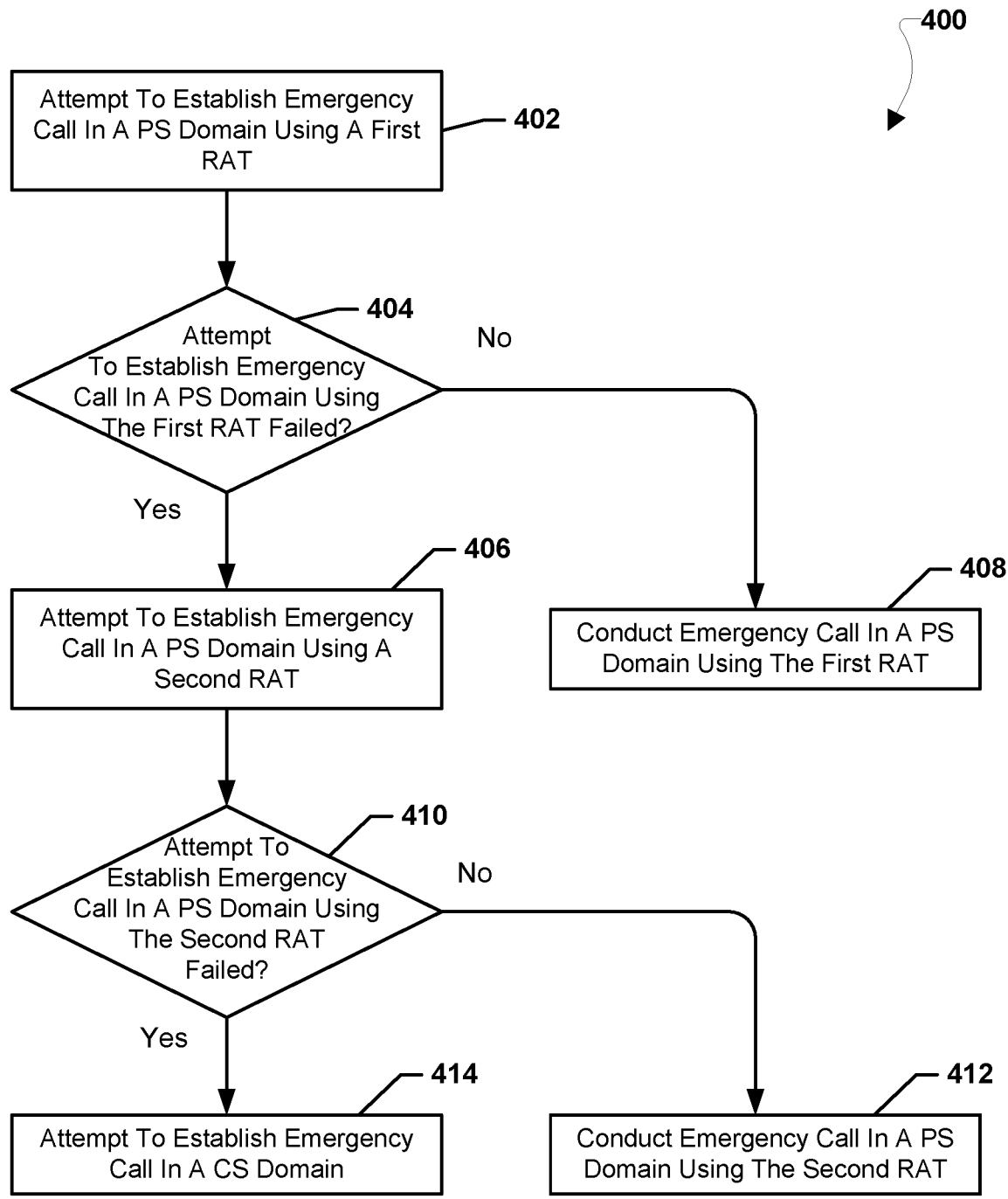
FIG. 4C is process flow diagram illustrating a method for performing an emergency call according to various embodiments.

FIG. 4C illustrates a method 400 for performing an emergency call according to various embodiments. With reference to FIGS. 1-4C, the operations of the method 400 may be performed by a processor of a mobile communication devices (e.g., mobile communication device 102, mobile communication device 200, SIP 300, etc.).

In block 402, the processor may attempt to establish an emergency call in a PS domain using a first RAT. For example, the mobile communication device may store a database of emergency numbers in memory. If the number that the user dials matches one of the emergency numbers, the mobile communication device may identify the call as an emergency call and may attempt to establish the emergency call in a PS domain using a first RAT. For example, the processor may attempt to establish an emergency call in a PS domain using a 5G-NR RAT, a LTE-5GCN RAT, or a LTE-EPC RAT. Emergency calls may be attempted for a variety of other reasons as well, such as in response to an automatic detection of an emergency condition (e.g., a medical condition for a user of the mobile communication device) by a sensor of the mobile communication device, etc.

In determination block 404, the processor may determine whether the attempt to establish the emergency call in a PS domain using the first RAT failed. For example, the processor may determine whether an error indication was returned by the network, whether an attempt timer expired, and/or any other type event occurred during attempting the emergency call to determine whether the attempt to establish the emergency call in a PS domain using the first RAT failed. Alternatively, an indication that the call was successful may indicate the attempt to establish the emergency call in a PS domain using the first RAT succeeded.

In response to determining that the attempt to establish the emergency call in a PS domain using the first RAT succeeded (i.e., determination block 404="No"), the processor may conduct the emergency call in a PS domain using the first RAT in block 408.

In response to determining that the attempt to establish the emergency call in a PS domain using the first RAT failed (i.e., determination block 404="Yes"), the processor may attempt to establish an emergency call in a PS domain using a second RAT in block 406. For example, the processor may be configured to default to a second RAT different than the first RAT based on a user setting, network setting, or other predetermined configuration. The second RAT may be a RAT different than the first RAT used for the initial attempt of the emergency call. The second RAT may be used to attempt to establish the emergency call in the PS domain in response to determining that a first attempt to establish the emergency call in the PS domain with a first RAT failed. For example, a LTE-5GCN RAT may be selected as the second RAT when the emergency call initially failed using a 5G-NR RAT. As a further example, a LTE-EPC RAT may be selected as the second RAT when the emergency call initially failed using a 5G-NR RAT. As another example, a LTE-5GCN RAT may be selected as the second RAT when the emergency call initially failed using a LTE-EPC RAT. As a further example, a 5G-NR RAT may be selected as the second RAT when the emergency call initially failed using a LTE-EPC RAT. As another example, a LTE-EPC RAT may be selected as the second RAT when the emergency call initially failed using a LTE-5GCN RAT. As a further example, a 5G-NR RAT may be selected as the second RAT when the emergency call initially failed using a LTE-5GCN RAT. In various embodiments, the second attempt in the PS domain using the second RAT may be an attempt to establish the emergency call using the same subscription as was used for the first attempt in the PS domain. In various embodiments, the different RATs operating in the PS domain for the different emergency call attempts may be operating in normal mode during each attempt of the same emergency call. For example, both the first RAT and the second RAT may be operating in normal mode. In various embodiments, the first RAT and the second RAT attempting the emergency call may both be using the same subscription and both be operating in normal mode.

In determination block 410, the processor may determine whether the attempt to establish the emergency call in a PS domain using the second RAT failed. For example, the processor may determine whether an error indication was returned by the network, whether an attempt timer expired, and/or any other type event occurred during attempting the emergency call to determine whether the attempt to establish the emergency call in a PS domain using the second RAT failed. Alternatively, an indication that the call was successful may indicate the attempt to establish the emergency call in a PS domain using the second RAT succeeded.

In response to determining that the attempt to establish the emergency call in a PS domain using the second RAT succeeded (i.e., determination block 410="No"), the processor may conduct the emergency call in a PS domain using the second RAT in block 412.

In response to determining that the attempt to establish the emergency call in a PS domain using the second RAT failed (i.e., determination block 410="Yes"), the processor may attempt to establish an emergency call in a CS domain in block 414. For example, the processor may attempt to establish the emergency call using a WCDMA RAT. In some embodiments, attempting to establish the call in the CS domain in block 414 may fail as no CS domain may be provided by the network at that geographic location.

Figure 5:
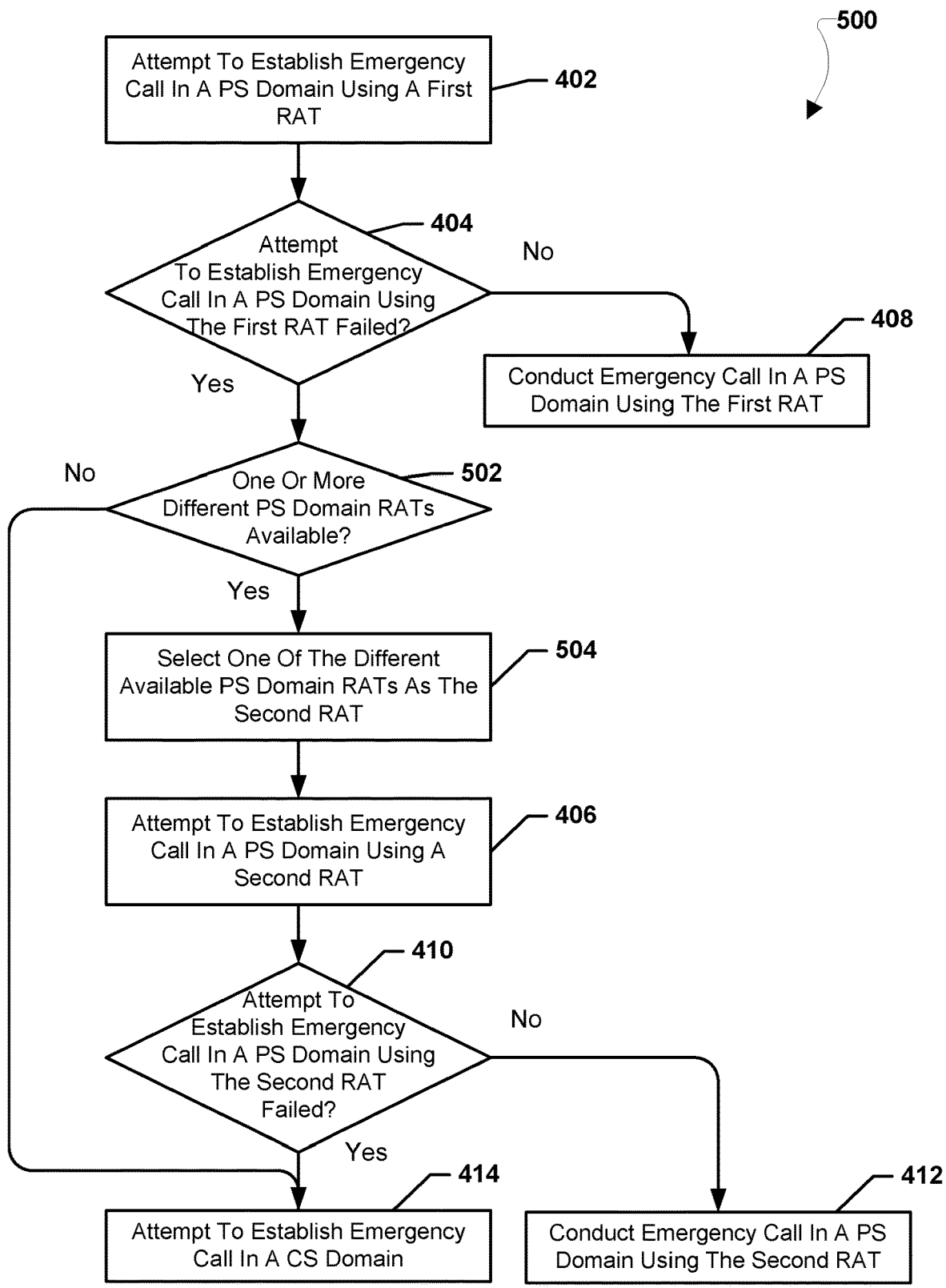
FIG. 5 is process flow diagram illustrating a method for performing an emergency call according to various embodiments.

FIG. 5 illustrates a method 500 for performing an emergency call according to various embodiments. With reference to FIGS. 1-5, the operations of the method 500 may be performed by a processor of a mobile communication devices (e.g., mobile communication device 102, mobile communication device 200, SIP 300, etc.). In some embodiments, the operations of the method 500 may be performed in conjunction with operations of the method 400.

In blocks 402, 404, and 408 the processor may perform operations of like numbered blocks as described with reference to method 400.

In response to determining that the attempt to establish the emergency call in a PS domain using the first RAT failed (i.e., determination block 404="Yes"), the processor may determine whether one or more different PS domain RATs are available in determination block 502. For example, the processor may determine whether the network the mobile communication device is currently attached to supports different PS domain RATs than was used in the first emergency call attempt. As another example, the processor may determine whether RF resources associated with different PS domain RATs are available for use on the mobile communication device. For example, RF resources for every type of PS domain RAT may not be present on different mobile communication devices and/or the operating state may be such that an RF resource may be unusable at a given time (e.g., powered down, in a failure state, etc.)

In response to determining that no different PS domain RATs are available (i.e., determination block 502="No"), the processor may attempt to establish an emergency call in a CS domain in block 414 as described with reference to method 400.

In response to determining that one or more different PS domain RATs are available (i.e., determination block 502="Yes"), the processor may select one of the different available PS domain RATs as the second RAT in block 504. In various embodiments, the second RAT may be selected based on user preferences, network settings, device conditions, Quality of Service measurements on the different RATs, or any other criteria that may be used to select among the available RATs.

In blocks 406, 410, 412, and 414 the processor may perform operations of like numbered blocks as described with reference to method 400.

Figure 6A:
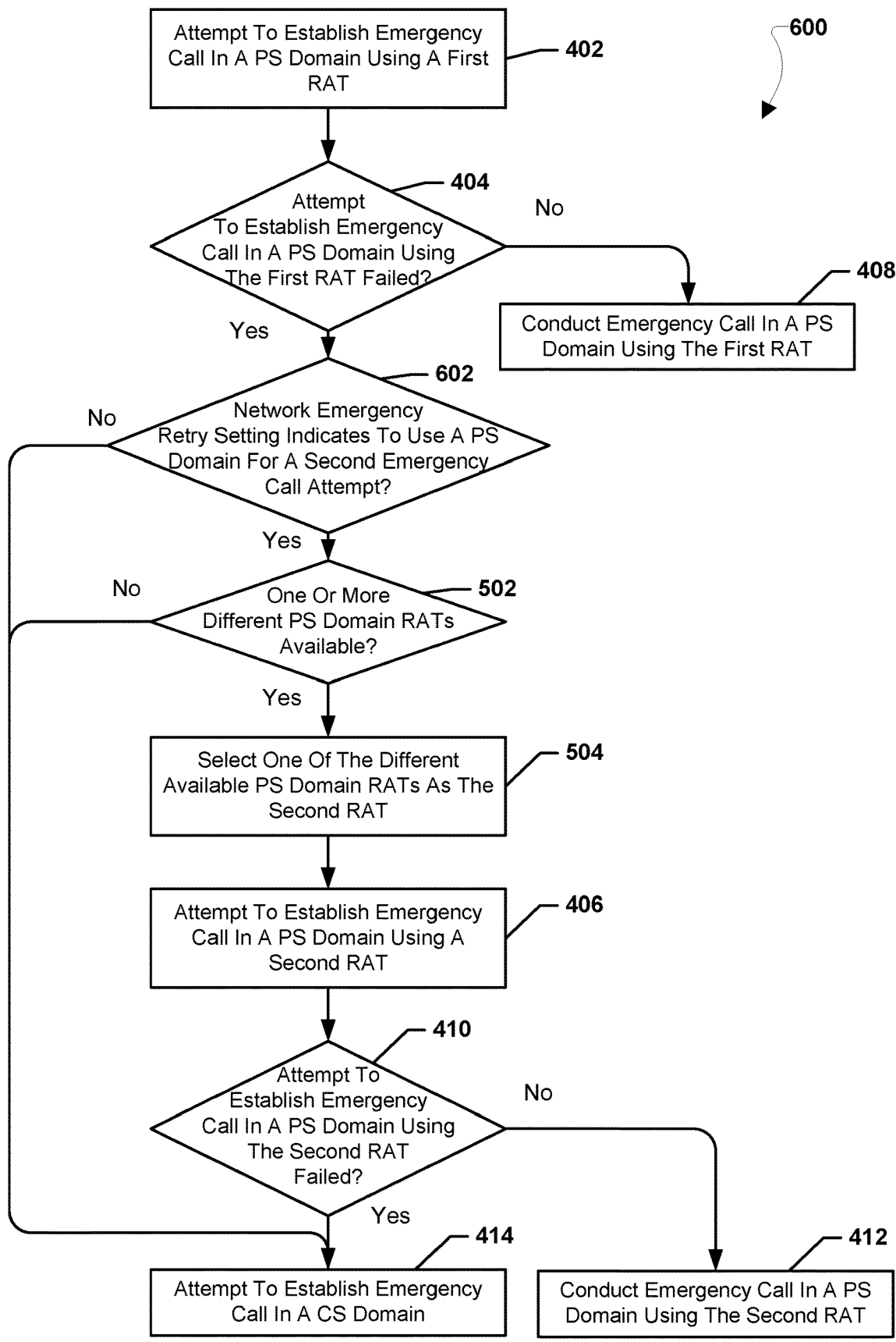
FIG. 6A is process flow diagram illustrating a method for performing an emergency call according to various embodiments.

FIG. 6A illustrates a method 600 for performing an emergency call according to various embodiments. With reference to FIGS. 1-6A, the operations of the method 600 may be performed by a processor of a mobile communication devices (e.g., mobile communication device 102, mobile communication device 200, SIP 300, etc.). In some embodiments, the operations of the method 600 may be performed in conjunction with operations of the methods 400 and/or 500.

In blocks 402, 404, and 408 the processor may perform operations of like numbered blocks as described with reference to method 400.

In response to determining that the attempt to establish the emergency call in a PS domain using the first RAT failed (i.e., determination block 404="Yes"), the processor may determine whether a network emergency retry setting indicates to use a PS domain for a second emergency call attempt in determination block 602. In various embodiments, a network emergency retry setting may indicate whether or not to use a PS domain for a second emergency call attempt. In various embodiments, the network emergency retry setting may be a setting controlled by a network entity. For example, the network emergency retry setting may indicate whether or not a CS domain is present in a geographic area. A network entity may determine whether a CS domain is present and may send a message or an indication to a mobile communication device indicating whether a CS domain is present. For example, an indication of whether a CS domain is present may be sent by the network entity (e.g. an AMF) to the mobile communication device in response to the sending of a Registration request by the mobile device to the network entity when the network entity is an Access and Mobility management Function (AMF) in 5GCN 108 or in response to the sending of an Attach request or a Tracking Area Update request by the mobile device to the network entity when the network entity is a Mobility Management Entity (MME) in EPC 107. When a CS domain is indicated as not present in the network emergency retry setting, the mobile communication device may use a PS domain to re-attempt an emergency call in response to a first attempt at the emergency call failing in the PS domain. In some embodiments, the network emergency retry setting may be a setting controlled by the mobile communication device.

In response to determining that the network emergency retry setting does not indicate to use a PS domain for a second emergency call attempt (i.e., determination block 602="No"), the processor may attempt to establish an emergency call in a CS domain in block 414 as described with reference to method 400.

In response to determining that the network emergency retry setting does indicate to use a PS domain for a second emergency call attempt (i.e., determination block 602="Yes"), in blocks 502, 504, 406, 410, 412, and 414 the processor may perform operations of like numbered blocks as described with reference to methods 400 and 500.

Figure 6B:
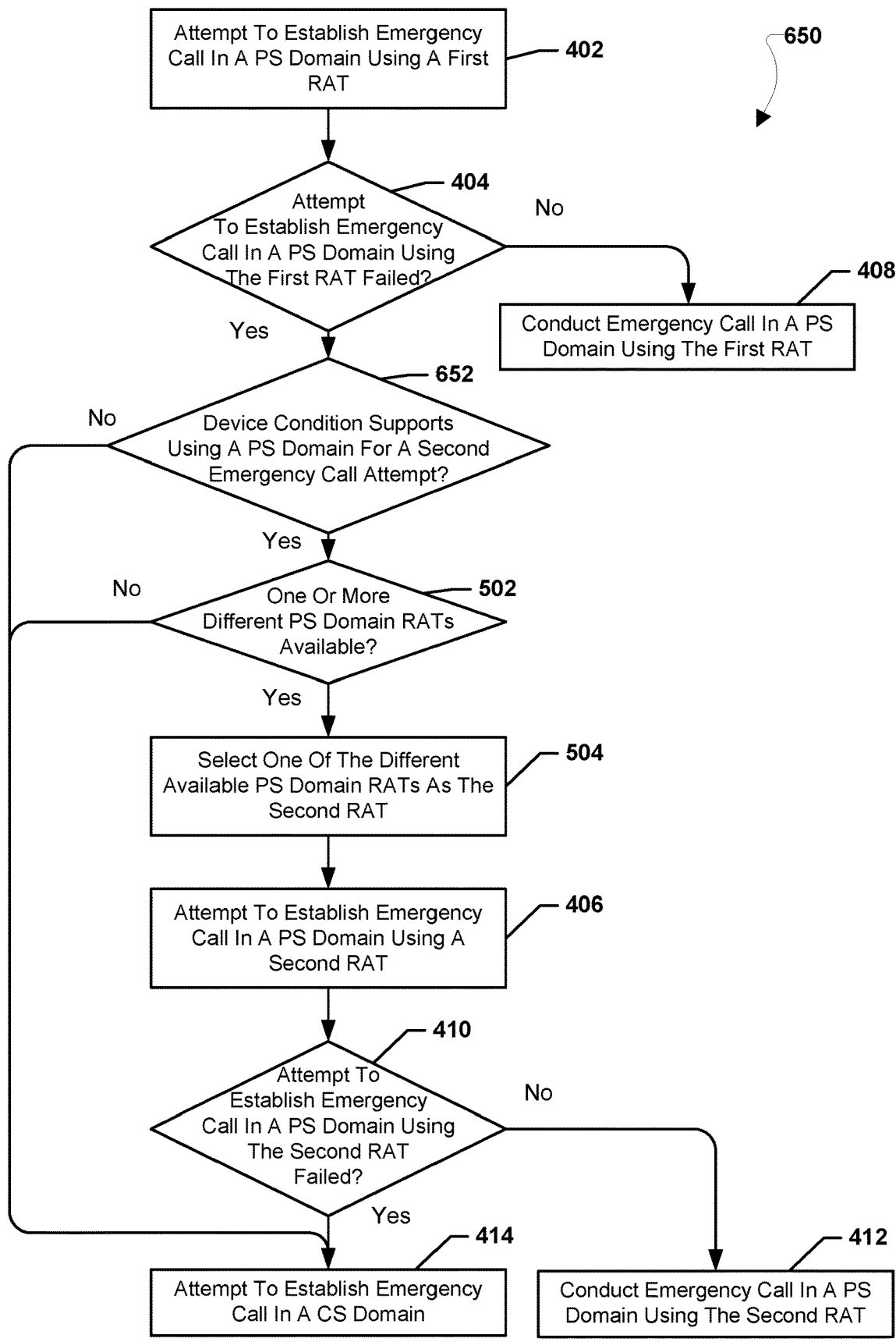
FIG. 6B is process flow diagram illustrating a method for performing an emergency call according to various embodiments.

FIG. 6B illustrates a method 650 for performing an emergency call according to various embodiments. With reference to FIGS. 1-6B, the operations of the method 650 may be performed by a processor of a mobile communication devices (e.g., mobile communication device 102, mobile communication device 200, SIP 300, etc.). In some embodiments, the operations of the method 650 may be performed in conjunction with operations of the methods 400, 500, and/or 600.

In blocks 402, 404, and 408 the processor may perform operations of like numbered blocks as described with reference to method 400.

In response to determining that the attempt to establish the emergency call in a PS domain using the first RAT failed (i.e., determination block 404="Yes"), the processor may determine whether a device condition supports using a PS domain for a second emergency call attempt in determination block 652. As examples, mobile communication device conditions may include one or more of a current location of the mobile communication device, a network identity of a network to which the mobile communication device is currently attached, a network identify of another network, a country of a network, a setting of the mobile communication device, an operating mode of the mobile communication device, etc. As a specific example, in a geographic area known to have sporadic or no CS domain coverage, the mobile communication device condition may support using a PS domain for a second emergency call attempt if a current location of the mobile device or a network identity of a network to which the mobile communication device is currently attached indicates that the mobile device is, or may be, in the geographic area. As another specific example, the mobile communication device may recognize a network identity of an attached network as a network in which the PS domain should be used for a second emergency call attempt.

In response to determining that a device condition does not support using a PS domain for a second emergency call attempt (i.e., determination block 652="No"), the processor may attempt to establish an emergency call in a CS domain in block 414 as described with reference to method 400.

In response to determining that a device condition does support using a PS domain for a second emergency call attempt (i.e., determination block 652="Yes"), in blocks 502, 504, 406, 410, 412, and 414 the processor may perform operations of like numbered blocks as described with reference to methods 400 and 500.

Figure 7:
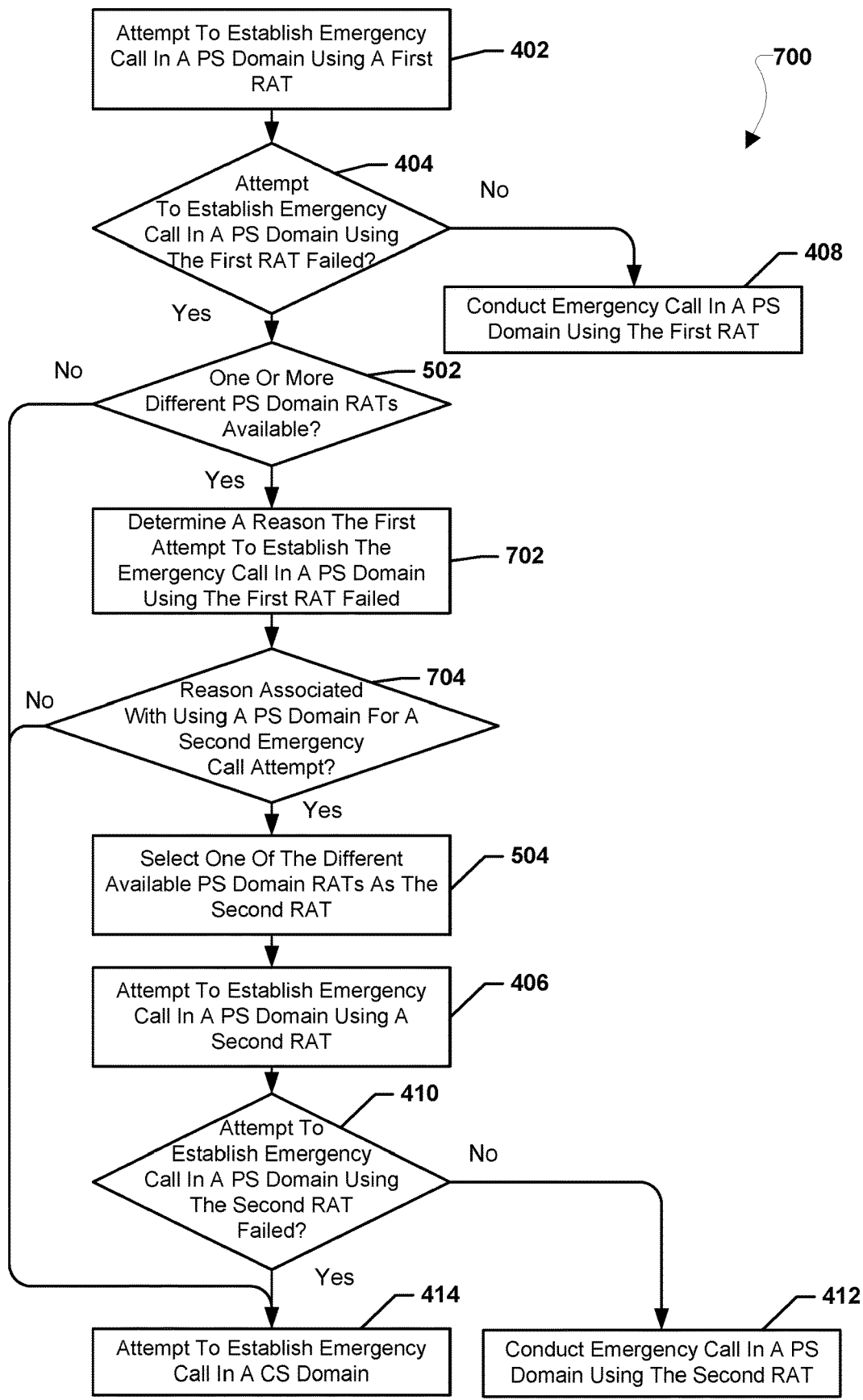
FIG. 7 is process flow diagram illustrating a method for performing an emergency call according to various embodiments.

FIG. 7 illustrates a method 700 for performing an emergency call according to various embodiments. With reference to FIGS. 1-7, the operations of the method 700 may be performed by a processor of a mobile communication devices (e.g., mobile communication device 102, mobile communication device 200, SIP 300, etc.). In some embodiments, the operations of the method 700 may be performed in conjunction with operations of the methods 400, 500, 600, and/or 650.

In blocks 402, 404, 408, and 502 the processor may perform operations of like numbered blocks as described with reference to methods 400 and 500.

In response to determining that one or more different PS domain RATs are available (i.e., determination block 502="Yes"), the processor may determine a reason for why the first attempt to establish the emergency call in a PS domain using the first RAT failed in block 702. In various embodiments, the processor of the mobile communication device may determine a reason the first attempt to establish an emergency call in a PS domain using a first RAT failed. For example, the processor may determine the initial failure is due to a problem at the AS level, NAS level, or other level of the wireless protocol stacks.

In determination block 704, the processor may determine whether the reason is associated with using a PS domain for a second emergency call attempt. In various embodiments, the reasons for call failure may be associated with using a PS domain for a second emergency call attempt and/or not using a PS domain for a second emergency call attempt. For example, failures at the AS level and NAS level may be associated with using a PS domain for a second emergency call attempt, while failures at other levels may not be associated with using a PS domain for a second emergency call attempt. In response to determining the reason for call failure is associated with using a PS domain for a second emergency call attempt, the processor may use a PS domain RAT to reattempt the emergency call.

In response to determining that the reason is not associated with using a PS domain for a second emergency call attempt (i.e., determination block 704="No"), the processor may attempt to establish an emergency call in a CS domain in block 414 as described with reference to method 400.

In response to determining that the reason is associated with using a PS domain for a second emergency call attempt (i.e., determination block 704="Yes"), in blocks 504, 406, 410, 412, and 414 the processor may perform operations of like numbered blocks as described with reference to methods 400 and 500.

Figure 8:
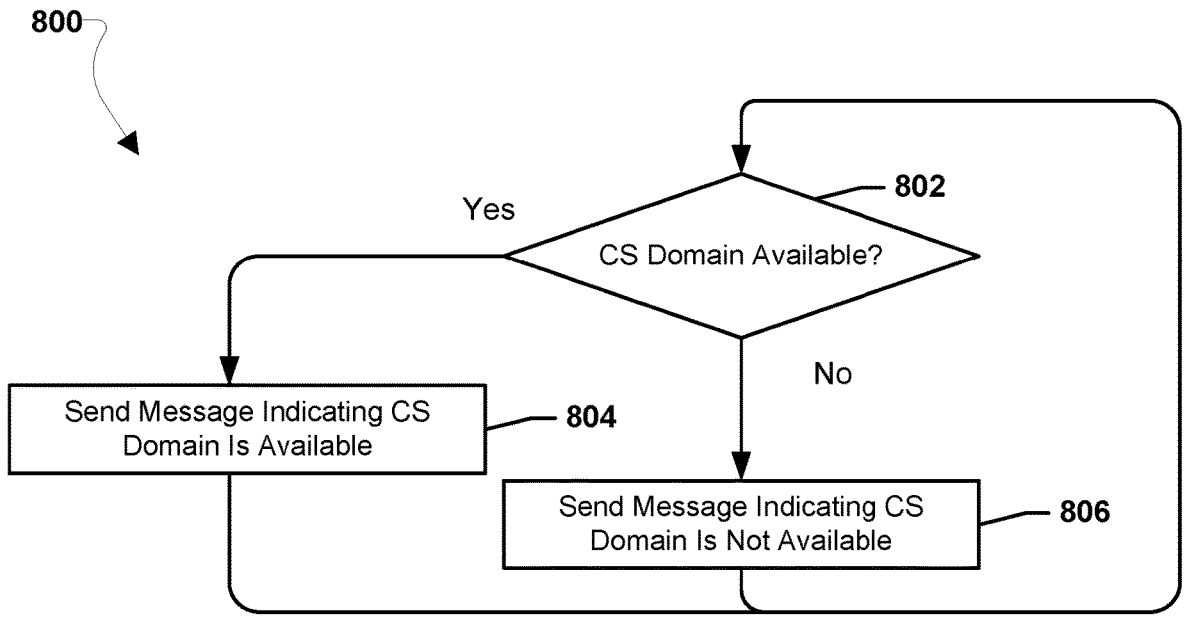
FIG. 8 is process flow diagram illustrating a method for indicating circuit switched (CS) domain availability according to various embodiments.

FIG. 8 illustrates a method 800 for indicating CS domain availability according to various embodiments. With reference to FIGS. 1-8, the operations of the method 800 may be performed by a processor of a server (e.g., mobile provider server 113, etc.). In some embodiments, the operations of the method 800 may be performed in conjunction with operations of the methods 400, 500, 600, 650, and/or 700.

In determination block 802, the server may determine whether a CS domain is available. A network entity may determine whether a CS domain is present and may send a message to a mobile communication device indicating whether a CS domain is present. For example, a network entity may determine whether a CS domain is present in different geographic regions of a network.

In response to determining that the CS domain is available (i.e., determination block 802="Yes"), the server may send a message indicating the CS domain is available in block 804. For example, the message may be a message indicating a network emergency retry setting indicating the CS domain is available. The message may be sent to a mobile communication device via one or more RATs.

In response to determining that the CS domain is not available (i.e., determination block 802="No"), the server may send a message indicating the CS domain is not available in block 806. For example, the message may be a message indicating a network emergency retry setting indicating the CS domain is not available. The message may be sent to a mobile communication device via one or more RATs.

Figure 9:
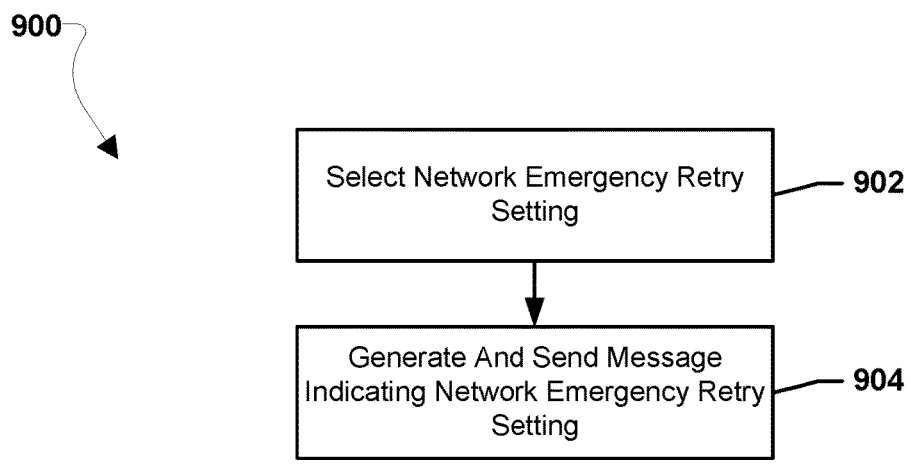
FIG. 9 is process flow diagram illustrating a method for sending a message indicating a network emergency retry setting according to various embodiments.

FIG. 9 illustrates a method 900 for sending a message indicating a network emergency retry setting according to various embodiments. With reference to FIGS. 1-9, the operations of the method 900 may be performed by a processor of a server (e.g., mobile provider server 113, etc.). In some embodiments, the operations of the method 900 may be performed in conjunction with operations of the methods 400, 500, 600, 650, 700, and/or 800.

In block 902, the server may select a network emergency retry setting. In various embodiments, the network emergency retry setting may be a setting controlled by a network entity. For example, the network emergency retry setting may indicate whether or not a CS domain is present in a geographic area. Additionally, the network emergency retry setting may indicating whether a mobile communication device is to use a PS domain to reattempt an emergency call in response to a first attempt at the emergency call failing in the PS domain or the mobile communication device is to use a CS domain to reattempt an emergency call in response to a first attempt at the emergency call failing in the PS domain.

In block 904, the server may generate and send a message indicating the network emergency retry setting. The message may be sent to a mobile communication device via one or more RATs.

Figure 10:
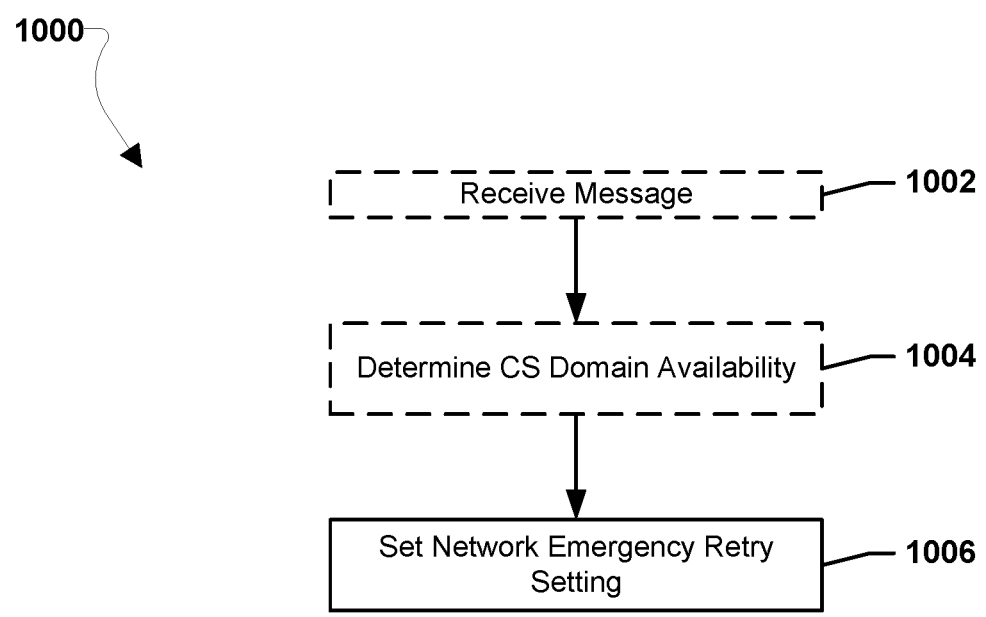
FIG. 10 is process flow diagram illustrating a method for setting a network emergency retry setting according to various embodiments.

FIG. 10 illustrates a method 1000 for setting a network emergency retry setting according to various embodiments. With reference to FIGS. 1-10, the operations of the method 1000 may be performed by a processor of a mobile communication devices (e.g., mobile communication device 102, mobile communication device 200, SIP 300, etc.). In some embodiments, the operations of the method 1000 may be performed in conjunction with operations of the methods 400, 500, 600, 650, 700, 800, and/or 900.

In optional block 1002, the processor may receive a message. Block 1002 may be optional as not all networks may send messages related to network emergency retry settings to mobile communication devices. The message may include an indication of a network emergency retry setting. The network emergency retry setting may be a setting controlled by a network entity. For example, the network emergency retry setting may indicate whether or not a CS domain is present in a geographic area. Additionally, the network emergency retry setting may indicating whether a mobile communication device is to use a PS domain to reattempt an emergency call in response to a first attempt at the emergency call failing in the PS domain or the mobile communication device is to use a CS domain to reattempt an emergency call in response to a first attempt at the emergency call failing in the PS domain.

In optional block 1004, the processor may determine CS domain availability. Block 1004 may be optional as not all mobile communication devices may be configured to determine CS domain availability. Alternatively, some may have CS domain availability indicated by messages from the network. When a processor is configured to determine CS domain availability, the processor may perform operations to detect and/or test the operation of a CS domain RAT. For example, the processor may attempt to attach to a CS domain of a network to determine CS domain availability. Additionally, the processor may determine CS domain availability in other manners, such as by monitoring settings and/or network level indications.

In block 1006, the processor may set the network emergency retry setting. The network emergency retry setting may indicate whether or not a CS domain is present in a geographic area. Additionally, the network emergency retry setting may indicating whether a mobile communication device is to use a PS domain to reattempt an emergency call in response to a first attempt at the emergency call failing in the PS domain or the mobile communication device is to use a CS domain to reattempt an emergency call in response to a first attempt at the emergency call failing in the PS domain. The network emergency retry setting may be set by the mobile communication device based on one or more of the received messages, determinations of the CS domain availability, and/or other factors.

Figure 11:
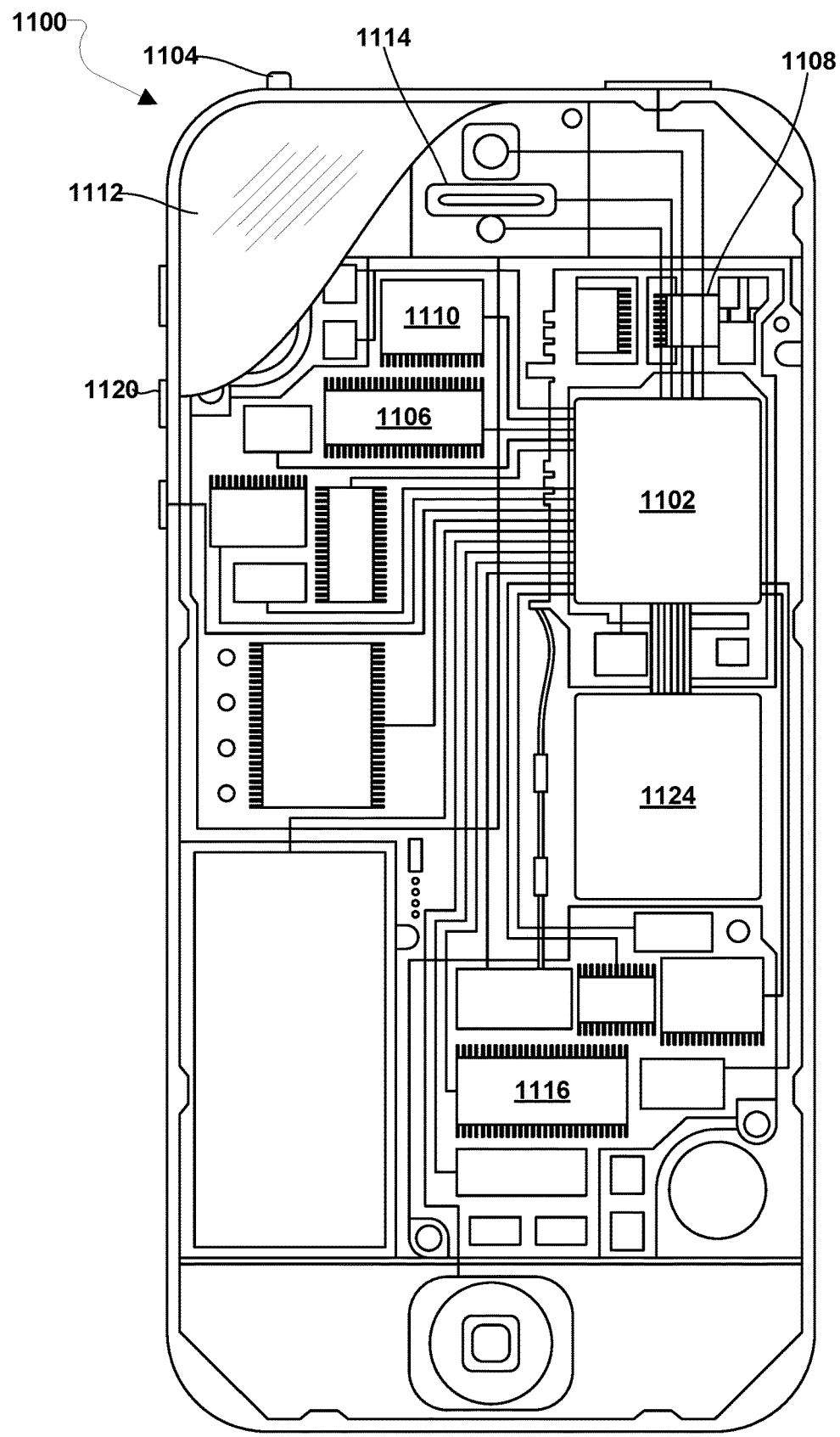
FIG. 11 is a component block diagram of a mobile communication device that may be configured to implement methods for performing an emergency call and/or setting a network emergency retry setting in accordance with various embodiments.

The various aspects (including, but not limited to, embodiments discussed above with reference to FIGS. 1-10) may be implemented on a variety of mobile communication devices, an example of which is illustrated in FIG. 11 in the form of a smartphone. With reference to FIGS. 1-11, a smartphone 1100 may include a first SoC 1102 (e.g., a SoC-CPU) coupled to a second SoC 1124 (e.g., a 5G capable SoC) and a third SoC 1116 (e.g., a SoC configured for managing device-to-device (D2D) links, such as D2D links establish in the dedicated Intelligent Transport System (ITS) 5.9 GHz spectrum communications). The first, second, and/or third SoCs 1102, 1124, and 1116 may be coupled to internal memory 1106, a display 1112, and to a speaker 1114. Additionally, the smartphone 1100 may include one or more antenna 1104 for sending and receiving electromagnetic radiation that may be connected to one or more transceiver 1108 (e.g., a wireless data link and/or cellular transceiver, etc.) coupled to one or more processors in the first, second, and/or third SoCs 1102, 1124, and 1116. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first, second, and/or third SoCs 1102, 1124, and 1116, transceiver 1108 and CODEC circuit 1110 may include a digital signal processor (DSP) circuit (not shown separately).

Figure 12:
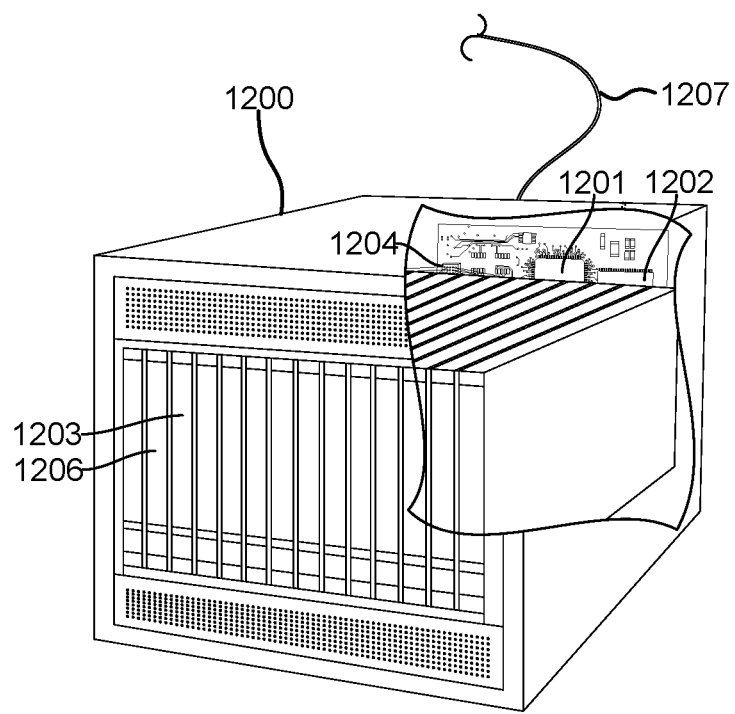
FIG. 12 is a component block diagram of a server that may be configured to implement methods for sending a message indicating a network emergency retry setting and/or indicating CS domain availability in accordance with various embodiments.

The various embodiments (including, but not limited to, embodiments discussed above with reference to FIGS. 1-10) may also be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or digital versatile disc (DVD) disc drive 1206 coupled to the processor 1201. The server 1200 may also include one or more wired or wireless network transceivers 1204, such one or more network access ports and/or wired or wireless modems (e.g., one wired or wireless modem, two wired or wireless modems, three wired or wireless modems, four wired or wireless modems, or more than four wired or wireless modems), coupled to the processor 1201 for establishing network interface connections with one or more communication networks 1207, such as a local area network (e.g., Ethernet, etc.) coupled to other computing devices and/or servers, the Internet, the public switched telephone network, and/or one or more cellular networks (e.g., CDMA, GSM, LTE, 5G, or any other type of cellular network).

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), Cellular Vehicle-to-Everything (C-V2X), etc. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for performing an emergency call on a mobile communication device, comprising:

attempting, by a processor of the mobile communication device, to establish an emergency call in a Packet Switched (PS) domain using a first radio access technology (RAT) for a first wireless network;

receiving, by the processor, a first indication that the attempt to establish the emergency call in a PS domain using the first RAT has failed;

determining, by the processor, whether the first indication indicates a failure above a Non-Access Stratum (NAS) level;

attempting, by the processor, to establish the emergency call in a PS domain using a second RAT for a second wireless network in response to determining that the first indication does not indicate the failure above the NAS level, and wherein the second RAT is different from the first RAT; and attempting, by the processor, to establish the emergency call in a Circuit Switched (CS) domain using a third RAT for a third wireless network in response to determining that the first indication does indicate the failure above the NAS level.

2. The method of claim 1, wherein the mobile communication device is in a normal service state for the first wireless network with a single subscriber identity module or is in a limited service state for the first wireless network.

3. The method of claim 1, wherein attempting to establish the emergency call in a PS domain using the second RAT is based on at least one or more of configuration information in the mobile communication device, an identity of the first wireless network, an identity of the second wireless network, a country for the first wireless network, a location of the mobile communication device, a cause of failure to establish the emergency call in a PS domain using the first RAT, and a second indication from the first wireless network.

4. The method of claim 1, further comprising receiving, by the processor, a second indication from the first wireless network, wherein attempting to establish the emergency call in a PS domain using the second RAT is based at least in part on the second indication from the first wireless network.

5. The method of claim 4, wherein the second indication is received from the first wireless network using broadcast or using a Non-Access Stratum (NAS) protocol.

6. The method of claim 4, wherein the second indication comprises an indication that a Circuit Switched (CS) domain is not available.

7. The method of claim 1, further comprising:
receiving, by the processor, a second indication that the attempt to establish the emergency call in a PS domain using the second RAT has failed; and
attempting, by the processor, to establish the emergency call in a CS domain using the third RAT for the third wireless network in response to the second indication.

8. The method of claim 1, wherein the first wireless network and the second wireless network comprise wireless networks for the same wireless network operator.

9. The method of claim 1, wherein the first RAT and the second RAT each comprise one of Long Term Evolution (LTE) connected to an Evolved Packet Core (EPC), New Radio (NR), or LTE connected to a 5G Core Network (5GCN).

10. A mobile communication device, comprising:
a processor configured with processor-executable instructions to perform operations comprising:
attempting to establish an emergency call in a Packet Switched (PS) domain using a first radio access technology (RAT) for a first wireless network;
receiving a first indication that the attempt to establish the emergency call in a PS domain using the first RAT has failed;
determining whether the first indication indicates a failure above a Non-Access Stratum (NAS) level;
attempting to establish the emergency call in a PS domain using a second RAT for a second wireless network in response to determining that the first indication does not indicate the failure above the NAS level, and wherein the second RAT is different from the first RAT; and
attempting to establish the emergency call in a Circuit Switched (CS) domain using a third RAT for a third wireless network in response to determining that the first indication does indicate the failure above the NAS level.

11. The mobile communication device of claim 10, wherein the processor is configured with processor-executable instructions to perform operations such that attempting to establish the emergency call in a PS domain using the second RAT is based on at least one or more of configuration information in the mobile communication device, an identity of the first wireless network, an identity of the second wireless network, a country for the first wireless network, a location of the mobile communication device, a cause of failure to establish the emergency call in a PS domain using the first RAT, and a second indication from the first wireless network.

12. The mobile communication device of claim 10, wherein the processor is configured with processor-executable instructions to perform operations further comprising receiving a second indication from the first wireless network, wherein attempting to establish the emergency call in a PS domain using the second RAT is based at least in part on the second indication from the first wireless network.

13. The mobile communication device of claim 12, wherein the processor is configured with processor-executable instructions to perform operations such that the second indication is received from the first wireless network using broadcast or using a Non-Access Stratum (NAS) protocol.

14. The mobile communication device of claim 12, wherein the processor is configured with processor-executable instructions to perform operations such that the second indication comprises an indication that a Circuit Switched (CS) domain is not available.

15. The mobile communication device of claim 10, wherein the processor is configured with processor-executable instructions to perform operations further comprising:
receiving a second indication that the attempt to establish the emergency call in a PS domain using the second RAT has failed; and
in response to the second indication, attempting to establish the emergency call in a CS domain using the third RAT for the third wireless network.

16. A non-transitory processor-readable storage medium having stored thereon processor-executable instructions configured to cause a processor of a mobile communication device to perform operations comprising:
attempting to establish an emergency call in a Packet Switched (PS) domain using a first radio access technology (RAT) for a first wireless network;
receiving a first indication that the attempt to establish the emergency call in a PS domain using the first RAT has failed;
determining whether the first indication indicates a failure above a Non-Access Stratum (NAS) level;

attempting to establish the emergency call in a PS domain using a second RAT for a second wireless network in response to determining that the first indication does not indicate the failure above the NAS level, and wherein the second RAT is different from the first RAT; and attempting to establish the emergency call in a Circuit Switched (CS) domain using a third RAT for a third wireless network in response to determining that the first indication does indicate the failure above the NAS level.

* * * * *